(12) United States Patent
White et al.

(10) Patent No.: US 8,826,030 B2
(45) Date of Patent: Sep. 2, 2014

(54) METHODS AND SYSTEMS FOR AUTHENTICATING USERS

(75) Inventors: Conor Robert White, Fairfax, VA (US); Michael Peirce, Dublin (IE); Jason Scott Cramer, Vienna, VA (US); Chet Bradford Steiner, McLean, VA (US); Suzanna Diebes, Sterling, VA (US)

(73) Assignee: Daon Holdings Limited, George Town (KY)

( * ) Notice: Subject to any disclaimer, the term of this patent is extended or adjusted under 35 U.S.C. 154(b) by 711 days.

(21) Appl. No.: 12/729,167

(22) Filed: Mar. 22, 2010

(65) Prior Publication Data

US 2011/0231911 A1    Sep. 22, 2011

(51) Int. Cl.
G06F 21/00 (2013.01)
H04L 29/06 (2006.01)
G06F 21/32 (2013.01)

(52) U.S. Cl.
CPC ............... *H04L 63/08* (2013.01); *G06F 21/32* (2013.01)
USPC ............... 713/186; 713/168; 713/182; 726/4; 726/21; 726/28

(58) Field of Classification Search
None
See application file for complete search history.

(56) References Cited

U.S. PATENT DOCUMENTS

| 5,229,764 A | 7/1993 | Matchett et al. |
| 5,613,012 A | 3/1997 | Hoffman et al. |
| 5,615,277 A | 3/1997 | Hoffman |
| 5,764,789 A | 6/1998 | Pare, Jr. et al. |
| 5,802,199 A | 9/1998 | Pare, Jr. et al. |
| 5,805,719 A | 9/1998 | Pare, Jr. et al. |
| 5,838,812 A | 11/1998 | Pare, Jr. et al. |
| 5,870,723 A | 2/1999 | Pare, Jr. et al. |
| 5,982,914 A | 11/1999 | Lee et al. |
| 5,999,808 A | 12/1999 | LaDue |
| 6,012,039 A | 1/2000 | Hoffman et al. |

(Continued)

FOREIGN PATENT DOCUMENTS

| EP | 1 172 771 | 1/2002 |
| JP | 2002-269479 | 9/2002 |

(Continued)

OTHER PUBLICATIONS

U.S. Appl. No. 09/639,948 Specification and Drawings, filed on Aug. 17, 2000.

(Continued)

*Primary Examiner* — Jeffrey Pwu
*Assistant Examiner* — Carlos Amorin
(74) *Attorney, Agent, or Firm* — Kevin McDermott, Esq.

(57) ABSTRACT

A method of authenticating users to reduce transaction risks includes indicating a desire to conduct a transaction, inputting information in a workstation, and determining whether the inputted information is known. Moreover, the method includes determining a state of a communications device when the inputted information is known, and transmitting a biometric authentication request from a server to a workstation when the state of the communications device is enrolled. Additionally, the method includes obtaining biometric authentication data in accordance with a biometric authentication data capture request with the communications device, biometrically authenticating the user, generating a one-time pass-phrase and storing the one-time pass-phrase on the authentication system when the user is authenticated, comparing the transmitted one-time pass-phrase against the stored one-time pass-phrase, and conducting the transaction when the transmitted and stored one-time pass-phrases match.

14 Claims, 15 Drawing Sheets

(56) References Cited

U.S. PATENT DOCUMENTS

| | | |
|---|---|---|
| 6,016,476 A | 1/2000 | Maes et al. |
| 6,154,879 A | 11/2000 | Pare, Jr. et al. |
| 6,192,142 B1 | 2/2001 | Pare, Jr. et al. |
| 6,230,148 B1 | 5/2001 | Pare, Jr. et al. |
| 6,234,900 B1 | 5/2001 | Cumbers |
| 6,269,348 B1 | 7/2001 | Pare, Jr. et al. |
| 6,282,648 B1 | 8/2001 | Walker et al. |
| 6,366,682 B1 | 4/2002 | Hoffman et al. |
| 6,397,198 B1 | 5/2002 | Hoffman et al. |
| 6,411,728 B1 | 6/2002 | Lee et al. |
| 6,508,709 B1 | 1/2003 | Karmarkar |
| 6,581,042 B2 | 6/2003 | Pare, Jr. et al. |
| 6,591,002 B2 | 7/2003 | Lee et al. |
| 6,594,376 B2 | 7/2003 | Hoffman et al. |
| 6,636,973 B1 | 10/2003 | Novoa et al. |
| 6,662,166 B2 | 12/2003 | Pare, Jr. et al. |
| 6,694,436 B1 | 2/2004 | Audebert |
| 6,778,820 B2 | 8/2004 | Tendler |
| 6,783,459 B2 | 8/2004 | Cumbers |
| 6,846,238 B2 | 1/2005 | Wells |
| 6,879,966 B1 | 4/2005 | Lapsley et al. |
| 6,892,938 B2 | 5/2005 | Solomon |
| 6,920,435 B2 | 7/2005 | Hoffman et al. |
| 6,934,858 B2 | 8/2005 | Woodhill |
| 6,945,870 B2 | 9/2005 | Gatto et al. |
| 6,950,810 B2 | 9/2005 | Lapsley et al. |
| 6,979,264 B2 | 12/2005 | Chatigny et al. |
| 6,980,670 B1 | 12/2005 | Hoffman et al. |
| 6,984,175 B2 | 1/2006 | Nguyen et al. |
| 6,985,608 B2 | 1/2006 | Hoffman et al. |
| 7,004,389 B1 | 2/2006 | Robinson et al. |
| 7,054,811 B2 | 5/2006 | Barzilay |
| 7,073,067 B2 | 7/2006 | Mizrah |
| 7,082,415 B1 | 7/2006 | Robinson et al. |
| 7,107,245 B1 | 9/2006 | Kowalick |
| 7,114,080 B2 | 9/2006 | Rahman et al. |
| 7,130,452 B2 | 10/2006 | Bolle et al. |
| 7,152,045 B2 | 12/2006 | Hoffman |
| 7,155,416 B2 | 12/2006 | Shatford |
| 7,161,465 B2 | 1/2007 | Wood et al. |
| 7,175,528 B1 | 2/2007 | Cumbers |
| 7,178,025 B2 | 2/2007 | Scheidt et al. |
| 7,185,807 B1 | 3/2007 | Robinson et al. |
| 7,188,314 B2 | 3/2007 | Mizrah |
| 7,209,903 B1 | 4/2007 | Mamdani et al. |
| RE39,644 E | 5/2007 | Alcorn et al. |
| 7,222,101 B2 | 5/2007 | Bishop et al. |
| 7,225,156 B2 | 5/2007 | Fisher et al. |
| 7,246,244 B2 | 7/2007 | Nanavati et al. |
| 7,248,719 B2 | 7/2007 | Hoffman et al. |
| 7,269,737 B2 | 9/2007 | Robinson |
| 7,287,689 B2 | 10/2007 | Tidwell et al. |
| 7,288,025 B1 | 10/2007 | Cumbers |
| 7,297,062 B2 | 11/2007 | Gatto et al. |
| 7,319,987 B1 | 1/2008 | Hoffman et al. |
| 7,340,058 B2 | 3/2008 | Jakobsson et al. |
| 7,356,705 B2 | 4/2008 | Ting |
| 7,366,702 B2 | 4/2008 | David |
| 7,367,049 B1 | 4/2008 | Robinson et al. |
| 7,389,269 B1 | 6/2008 | Robinson et al. |
| 7,398,918 B1 | 7/2008 | Schwartz, Jr. |
| 7,398,925 B2 | 7/2008 | Tidwell et al. |
| 7,409,543 B1 | 8/2008 | Bjorn |
| 7,428,411 B2 | 9/2008 | Zellner |
| 7,437,147 B1 | 10/2008 | Luciano, Jr. |
| 7,437,330 B1 | 10/2008 | Robinson et al. |
| 7,441,263 B1 | 10/2008 | Bakshi et al. |
| 7,444,507 B2 | 10/2008 | Mak et al. |
| 7,464,059 B1 | 12/2008 | Robinson et al. |
| 7,472,425 B2 | 12/2008 | Suzuki et al. |
| 7,483,862 B1 | 1/2009 | Robinson et al. |
| 7,487,538 B2 | 2/2009 | Mok |
| 7,496,964 B2 | 2/2009 | Renfro et al. |
| 7,497,372 B1 | 3/2009 | Robinson et al. |
| 7,502,761 B2 | 3/2009 | Siegal et al. |
| 7,512,567 B2 * | 3/2009 | Bemmel et al. ................. 705/67 |
| 7,530,110 B2 | 5/2009 | Cheng et al. |
| 7,530,113 B2 | 5/2009 | Braun |
| 7,533,066 B1 | 5/2009 | Robinson et al. |
| 7,533,809 B1 | 5/2009 | Robinson et al. |
| 7,536,352 B2 | 5/2009 | Lapsley et al. |
| 7,542,590 B1 | 6/2009 | Robinson et al. |
| 7,549,576 B2 | 6/2009 | Alderucci et al. |
| 7,552,340 B2 | 6/2009 | Ooi et al. |
| 7,552,467 B2 | 6/2009 | Lindsay |
| 7,558,406 B1 | 7/2009 | Robinson et al. |
| 7,558,407 B2 | 7/2009 | Hoffman et al. |
| 7,562,814 B1 | 7/2009 | Shao et al. |
| 7,565,329 B2 | 7/2009 | Lapsley et al. |
| 7,574,733 B2 | 8/2009 | Woodhill |
| 7,577,847 B2 | 8/2009 | Nguyen et al. |
| 7,606,401 B2 | 10/2009 | Hoffman et al. |
| 7,613,659 B1 | 11/2009 | Hoffman et al. |
| 7,620,605 B2 | 11/2009 | Hoffman et al. |
| 7,623,659 B2 | 11/2009 | Huang et al. |
| 7,624,073 B1 | 11/2009 | Robinson et al. |
| 7,631,193 B1 | 12/2009 | Hoffman |
| 7,644,861 B2 | 1/2010 | Alderucci et al. |
| 7,685,629 B1 | 3/2010 | White et al. |
| 7,698,567 B2 | 4/2010 | Hoffman |
| 7,699,703 B2 | 4/2010 | Muir et al. |
| 7,747,528 B1 | 6/2010 | Robinson et al. |
| 7,765,164 B1 | 7/2010 | Robinson et al. |
| 7,769,695 B2 | 8/2010 | Robinson et al. |
| 7,775,879 B2 | 8/2010 | Walker et al. |
| 7,778,933 B2 | 8/2010 | Robinson et al. |
| 7,792,297 B1 | 9/2010 | Piccionelli et al. |
| 7,828,652 B2 | 11/2010 | Nguyen et al. |
| 7,865,937 B1 | 1/2011 | White et al. |
| 7,870,599 B2 | 1/2011 | Pemmaraju |
| 7,871,329 B2 | 1/2011 | Rowe |
| 7,877,798 B2 | 1/2011 | Saunders et al. |
| 7,886,156 B2 | 2/2011 | Franchi |
| 7,930,345 B2 | 4/2011 | Dhupelia et al. |
| 7,979,740 B2 | 7/2011 | Taylor et al. |
| 7,991,388 B1 | 8/2011 | Becker et al. |
| 8,015,595 B2 | 9/2011 | Benbrahim |
| 8,028,896 B2 | 10/2011 | Carter et al. |
| 8,070,604 B2 | 12/2011 | Amaitis et al. |
| 8,078,885 B2 | 12/2011 | Jobmann |
| 8,092,303 B2 | 1/2012 | Amaitis et al. |
| 8,123,616 B2 | 2/2012 | Wells et al. |
| 8,157,642 B2 | 4/2012 | Paulsen |
| 8,162,756 B2 | 4/2012 | Amaitis et al. |
| 8,201,229 B2 | 6/2012 | Ruppert et al. |
| 8,244,216 B1 | 8/2012 | Becker et al. |
| 8,443,202 B2 * | 5/2013 | White et al. ................. 713/186 |
| 2001/0027423 A1 | 10/2001 | Khidekel et al. |
| 2001/0034237 A1 | 10/2001 | Garahi |
| 2002/0026427 A1 | 2/2002 | Kon et al. |
| 2002/0115444 A1 | 8/2002 | Yu et al. |
| 2002/0124064 A1 | 9/2002 | Epstein et al. |
| 2002/0188842 A1 | 12/2002 | Willeby |
| 2003/0005290 A1 | 1/2003 | Fishman et al. |
| 2003/0036425 A1 | 2/2003 | Kaminkow et al. |
| 2003/0046587 A1 | 3/2003 | Bheemarasetti et al. |
| 2003/0131265 A1 | 7/2003 | Bhakta |
| 2003/0135740 A1 | 7/2003 | Talmor et al. |
| 2003/0139190 A1 | 7/2003 | Steelberg et al. |
| 2003/0159066 A1 | 8/2003 | Staw et al. |
| 2003/0163739 A1 | 8/2003 | Armington et al. |
| 2004/0059682 A1 | 3/2004 | Hasumi et al. |
| 2004/0143515 A1 | 7/2004 | Kawasaki |
| 2004/0148526 A1 * | 7/2004 | Sands et al. ................. 713/202 |
| 2004/0243848 A1 | 12/2004 | Blackburn et al. |
| 2004/0250085 A1 | 12/2004 | Tattan et al. |
| 2004/0254890 A1 | 12/2004 | Sancho et al. |
| 2005/0005127 A1 | 1/2005 | Rowe et al. |
| 2005/0096906 A1 | 5/2005 | Barzilay |
| 2005/0193198 A1 | 9/2005 | Livowsky |
| 2005/0273442 A1 | 12/2005 | Bennett et al. |
| 2006/0038655 A1 | 2/2006 | Hauke |
| 2006/0041755 A1 | 2/2006 | Pemmaraju |
| 2006/0053296 A1 | 3/2006 | Busboom et al. |

(56) References Cited

U.S. PATENT DOCUMENTS

| | | |
|---|---|---|
| 2006/0064588 A1 | 3/2006 | Tidwell et al. |
| 2006/0068904 A1 | 3/2006 | Nguyen et al. |
| 2006/0102717 A1 | 5/2006 | Wood et al. |
| 2006/0106734 A1 | 5/2006 | Hoffman et al. |
| 2006/0136739 A1 | 6/2006 | Brock et al. |
| 2006/0179304 A1 | 8/2006 | Han |
| 2006/0190455 A1 | 8/2006 | Braddy et al. |
| 2006/0230438 A1 | 10/2006 | Shappir et al. |
| 2006/0265602 A1 | 11/2006 | Robinson |
| 2006/0282660 A1 | 12/2006 | Varghese et al. |
| 2006/0288234 A1 | 12/2006 | Azar et al. |
| 2006/0293891 A1 | 12/2006 | Pathuel |
| 2007/0008924 A1 | 1/2007 | Moran |
| 2007/0016941 A1 | 1/2007 | Gonzalez et al. |
| 2007/0055517 A1 | 3/2007 | Spector |
| 2007/0079135 A1 | 4/2007 | Saito |
| 2007/0098235 A1 | 5/2007 | Halavee et al. |
| 2007/0113294 A1 | 5/2007 | Field et al. |
| 2007/0133843 A1 | 6/2007 | Nakatani |
| 2007/0143827 A1 | 6/2007 | Nicodemus et al. |
| 2007/0150965 A1 | 6/2007 | Redlich et al. |
| 2007/0155489 A1 | 7/2007 | Beckley et al. |
| 2007/0156436 A1 | 7/2007 | Fisher et al. |
| 2007/0162337 A1 | 7/2007 | Hawkins et al. |
| 2007/0169182 A1 | 7/2007 | Wolfond et al. |
| 2007/0180493 A1 | 8/2007 | Croft et al. |
| 2007/0202941 A1 | 8/2007 | Miltenberger et al. |
| 2007/0220596 A1 | 9/2007 | Keeler et al. |
| 2007/0250920 A1 | 10/2007 | Lindsay |
| 2007/0255841 A1 | 11/2007 | Chong |
| 2007/0282677 A1 | 12/2007 | Carpenter |
| 2007/0288319 A1 | 12/2007 | Robinson et al. |
| 2007/0288320 A1 | 12/2007 | Cooper et al. |
| 2007/0295807 A1 | 12/2007 | Antos et al. |
| 2007/0298887 A1 | 12/2007 | Ryan |
| 2008/0020788 A1 | 1/2008 | Griswold et al. |
| 2008/0021787 A1 | 1/2008 | Mackhouse |
| 2008/0034221 A1* | 2/2008 | Hammad et al. ............... 713/190 |
| 2008/0066165 A1* | 3/2008 | Rosenoer ..................... 713/182 |
| 2008/0072295 A1 | 3/2008 | Borenstein et al. |
| 2008/0086759 A1 | 4/2008 | Colson |
| 2008/0097851 A1 | 4/2008 | Bemmel et al. |
| 2008/0098464 A1 | 4/2008 | Mizrah |
| 2008/0102956 A1 | 5/2008 | Burman et al. |
| 2008/0147481 A1 | 6/2008 | Robinson et al. |
| 2008/0150677 A1 | 6/2008 | Arakawa |
| 2008/0172730 A1 | 7/2008 | Sandhu et al. |
| 2008/0233946 A1 | 9/2008 | Henry |
| 2008/0235771 A1 | 9/2008 | Corley et al. |
| 2008/0244712 A1 | 10/2008 | Kitada et al. |
| 2008/0244720 A1 | 10/2008 | Bartsch et al. |
| 2008/0249947 A1* | 10/2008 | Potter ............................ 705/67 |
| 2008/0271116 A1 | 10/2008 | Robinson et al. |
| 2008/0275821 A1 | 11/2008 | Bishop et al. |
| 2008/0287188 A1 | 11/2008 | Riera Jorba et al. |
| 2008/0313719 A1 | 12/2008 | Kaliski, Jr. et al. |
| 2008/0313726 A1 | 12/2008 | Gardner |
| 2009/0074256 A1 | 3/2009 | Haddad |
| 2009/0083847 A1 | 3/2009 | Fadell et al. |
| 2009/0083850 A1 | 3/2009 | Fadell et al. |
| 2009/0089869 A1 | 4/2009 | Varghese |
| 2009/0097661 A1 | 4/2009 | Orsini et al. |
| 2009/0099944 A1 | 4/2009 | Robinson et al. |
| 2009/0100270 A1 | 4/2009 | Ting |
| 2009/0113205 A1* | 4/2009 | Labaton ....................... 713/155 |
| 2009/0119754 A1* | 5/2009 | Schubert ............................ 726/4 |
| 2009/0138366 A1 | 5/2009 | Bemmel et al. |
| 2009/0176565 A1 | 7/2009 | Kelly |
| 2009/0177587 A1 | 7/2009 | Siegal et al. |
| 2009/0191857 A1 | 7/2009 | Horn et al. |
| 2009/0205033 A1 | 8/2009 | Lapsley et al. |
| 2009/0228362 A1 | 9/2009 | Lapsley et al. |
| 2009/0249478 A1 | 10/2009 | Rosener et al. |
| 2009/0259848 A1* | 10/2009 | Williams et al. ............... 713/168 |
| 2009/0265768 A1 | 10/2009 | Labaton |
| 2009/0265776 A1 | 10/2009 | Baentsch et al. |
| 2009/0271635 A1* | 10/2009 | Liu et al. ....................... 713/186 |
| 2009/0287837 A1 | 11/2009 | Felsher |
| 2009/0292927 A1 | 11/2009 | Wenzel et al. |
| 2009/0319798 A1 | 12/2009 | Ooi et al. |
| 2010/0031319 A1 | 2/2010 | Cohen et al. |
| 2010/0042848 A1 | 2/2010 | Rosener |
| 2010/0049659 A1* | 2/2010 | Cassone .......................... 705/64 |
| 2010/0062838 A1 | 3/2010 | Nguyen et al. |
| 2010/0103035 A1 | 4/2010 | Daneri |
| 2010/0105482 A1 | 4/2010 | Pacey et al. |
| 2010/0116884 A1 | 5/2010 | Alderucci et al. |
| 2010/0125737 A1* | 5/2010 | Kang ............................ 713/176 |
| 2010/0144426 A1 | 6/2010 | Winner et al. |
| 2010/0257357 A1* | 10/2010 | McClain ....................... 713/155 |
| 2011/0119754 A1 | 5/2011 | Larsen et al. |
| 2011/0151849 A9 | 6/2011 | Dupray et al. |
| 2011/0154497 A1* | 6/2011 | Bailey, Jr. ........................ 726/25 |
| 2011/0269535 A1 | 11/2011 | Kelly et al. |
| 2011/0282789 A1 | 11/2011 | Carroll et al. |
| 2011/0313872 A1 | 12/2011 | Carter et al. |
| 2012/0046096 A1 | 2/2012 | Morrison et al. |
| 2012/0066507 A1 | 3/2012 | Jobmann |
| 2012/0077570 A1 | 3/2012 | Kelly et al. |
| 2012/0088571 A1 | 4/2012 | Kelly et al. |
| 2012/0088572 A1 | 4/2012 | Kelly et al. |
| 2012/0108323 A1 | 5/2012 | Kelly et al. |
| 2012/0123943 A1 | 5/2012 | Potts et al. |
| 2012/0124651 A1* | 5/2012 | Ganesan et al. .................. 726/4 |
| 2012/0184352 A1 | 7/2012 | Detlefsen et al. |
| 2012/0202574 A1 | 8/2012 | Stanek et al. |
| 2013/0080789 A1* | 3/2013 | Headley ....................... 713/186 |
| 2013/0212655 A1* | 8/2013 | Hoyos et al. ....................... 726/5 |

FOREIGN PATENT DOCUMENTS

| | | |
|---|---|---|
| JP | 2006-155628 | 6/2006 |
| JP | 2008-129647 | 6/2008 |
| WO | 96/36934 | 11/1996 |
| WO | 00/45247 | 8/2000 |
| WO | 00/45320 | 8/2000 |
| WO | 00/46710 | 8/2000 |
| WO | 00/67187 | 11/2000 |
| WO | 01/06440 | 1/2001 |
| WO | 01/20531 | 3/2001 |
| WO | WO 03/062969 A1 | 7/2003 |
| WO | 2004/003689 | 1/2004 |
| WO | WO 2005/025292 A2 | 3/2005 |
| WO | WO 2005/025292 A3 | 3/2005 |
| WO | 2006/055887 | 5/2006 |
| WO | WO 2007/079595 A1 | 7/2007 |
| WO | 2007/092715 | 8/2007 |
| WO | 2008/002979 | 1/2008 |
| WO | 2008/048948 | 4/2008 |

OTHER PUBLICATIONS

U.S. Appl. No. 10/678,646 Specification and Drawings, filed on Oct. 6, 2003.

U.S. Appl. No. 10/725,394 Specification and Drawings, filed on Dec. 3, 2003.

U.S. Appl. No. 10/861,864 Specification and drawings, filed Jun. 7, 2004.

U.S. Appl. No. 10/891,503 Specification and drawings, filed Jul. 15, 2004.

U.S. Appl. No. 11/123,111 Specification and drawings, filed May 6, 2005.

U.S. Appl. No. 11/304,786 Specification and drawings, filed Dec. 16, 2005.

Extended European Search Report from counterpart foreign EPO Application No. 11157870.4, mailed on Aug. 3, 2011, pp. 1-5.

Bolton, Joshua B., E-Authentication Guidance for Federal Agencies, Office of Management and Budget, Washington, DC, Dec. 16, 2003, 17 pages.

Miller, Alison, Risks in Biometric-based Authentication Schemes, Global Information Assurance Certification Paper, Mar. 29, 2000, 6 pages.

(56) References Cited

OTHER PUBLICATIONS

Min et al., "A secure one-time password authentication scheme with low-computation for mobile communications", ACM SIGOPS Operating Systems Review,vol. 38, Issue 2 pp. 76-84.

Song et al. "An Identity-Based One-Time Password Scheme with Anonymous Authentication" NSWCTC, Wireless Communications and Trusted Computing—pp. 864-867 2008.

Jongpil et al., "Integrated OTP-Based User Authentication Scheme Using Smart Cards in Home Networks", IEEE Computer Society, p. 294 2008.

ByungRae et al., "Password Generation of OTP System using Fingerprint Features", IEEE Computer Society, pp. 243-247 2008.

Aloul et al. "Two factor authentication using mobile phones", Department of Computer Science & Engineering, Computer Systems and Applications, pp. 641-644 2009.

ByungeRae et al. "Design and Efficiency Analysis of New OTP System Using Homomorphic Graph of Fingerprint Features" Convergence and Hybrid Info. Tech., vol. 2, 585-590 2008.

ByungRay et al., "Random password generation of OTP system using changed location and angle of fingerprint features" Computer and Info. Tech., pp. 420-425 Jul. 2008.

Extended European Search Report from EPO Application No. 09172150.6, mailed on Dec. 3, 2009.

https://vipmobile.verisign.com/selectphonemodel.v—Printed pages of Verisign Identity Protection Mobile Center web site. There is also a video about VIP Access at the site.

\* cited by examiner

70

| LEVEL OF RISK (64) | BIOMETRIC DATA REQUIREMENT (72) |
|---|---|
| LOWEST | NONE |
| LOW | VOICE |
| HIGH | FACE AND IRIS |
| HIGHEST | VOICE, FACE AND IRIS |

| RISK FACTOR (76) | LEVEL OF RISK ADJUSTMENT (78) |
|---|---|
| Time of Day | Increase Level of Risk |
| Less than or Equal to Distance from Home | Decrease Level of Risk |
| Greater than Distance from Home Address | Increase Level of Risk |
| Duration since Previous Authentication | Increase Level of Risk |

FIG. 7

METHODS AND SYSTEMS FOR AUTHENTICATING USERS

BACKGROUND OF THE INVENTION

This invention relates generally to methods and systems for authenticating users over networks, and more particularly, to methods and systems of authenticating users over networks that increase the security of network-based transactions and thus reduce risks associated with such transactions.

Websites are generally established by entities on networks such that users are able to navigate to the websites to conduct site appropriate network-based transactions. As long as user information used to conduct network-based transactions on websites remains secret, such network-based transactions may be safely conducted without compromising the security of data that is accessible through the website, and without compromising privileged information of users. However, risks that such network-based transactions may be conducted fraudulently have increased due to password misuse, such as password sharing with untrustworthy third parties, and due to sophisticated techniques, such as phishing, developed by third parties to surreptitiously obtain user passwords. By obtaining user passwords, third parties are able to obtain information about individual users, and entities such as financial institutions, hospitals and national militaries. Such information may include social security numbers, credit card numbers, bank account numbers, private patient medical records and sensitive national military secrets. Third parties may use such information to conduct fraudulent network-based transactions with financial institutions and other commercial entities, blackmail patients to keep medical records confidential, and to anticipate and counter national military strategies.

Known authentication techniques that typically require users to enter the same unique username and the same unique password each time the web site is accessed may not adequately protect against fraudulently conducting network-based transactions and fraudulently accessing network accessible data, and thus may expose users and entities to increased network-based transactional risks. Consequently, it has been known to supplement such known authentication techniques with other authentication techniques by installing additional identification information on software or hardware tokens. However, generating the tokens themselves, constructing enrollment sites and systems for collecting enrollment information from users, procuring software and hardware to support token use, and maintaining such software and hardware systems is complex, expensive and time consuming.

BRIEF DESCRIPTION OF THE INVENTION

In one aspect, a method of authenticating users to reduce transaction risks is provided. The method includes storing biometric authentication data for each of a plurality of authorized users in an authentication system, and storing server data in a server. The authentication system is different than the server and the server is included in a first communications channel. The method also includes indicating a desire to conduct at least one transaction and inputting information in a workstation. A workstation user performs the indicating and inputting operations at the workstation. Moreover, the method includes determining whether the inputted information is known and determining a state of a communications device when the inputted information is known, transmitting a biometric authentication request from the server over the first communications channel to the workstation when the state of the communications device is enrolled, and prompting the workstation user to invoke a security application stored in the communications device.

The method also includes transmitting the biometric authentication request to the authentication system, extracting a level of risk from the biometric authentication request, determining a biometric authentication data requirement corresponding to the extracted level of risk by comparing the extracted level of risk against policy levels of risk included in an authentication policy, and determining the biometric authentication data requirement to be the biometric authentication data requirement that corresponds to the policy level of risk that matches the extracted level of risk. Furthermore, the method includes generating a biometric authentication data capture request in response to the biometric authentication request, and transmitting the biometric authentication data capture request from the authentication system to the communications device. The communications device is associated with one of the plurality of authorized users and the one authorized user is associated with the inputted information.

Additionally, the method includes obtaining the biometric authentication data capture request transmission, obtaining biometric authentication data in accordance with the biometric authentication data capture request from the workstation user with the communications device, and transmitting the obtained biometric authentication data from the communications device to the authentication system over a second communications channel. Moreover, the method includes validating the identity of the user by comparing the obtained biometric authentication data against biometric authentication data of the one authorized user stored in the authentication system, generating a one-time pass-phrase, storing the one-time pass-phrase on the authentication system and transmitting the one-time pass-phrase to the communications device over the second communications channel when the workstation user is authenticated as the one authorized user, obtaining the one-time pass-phrase from the communications device and entering the one-time pass-phrase into the workstation. Furthermore, the method includes transmitting the one-time pass-phrase from the workstation to the authentication system over the first communications channel, comparing the transmitted one-time pass-phrase against the stored one-time pass-phrase, and conducting the at least one transaction when the transmitted and stored one-time pass-phrases match.

In another aspect, a system for authenticating users that reduces transaction risks is provided. The system includes a computer configured as a server, the server includes at least a database and is configured to store within the database at least a plurality of configurable policies, to receive information inputted by the workstation user, to determine whether the inputted information is known, and to determine a level of risk associated with the at least one transaction. Moreover, the system includes at least one workstation including at least a workstation computer operationally coupled to the server. The at least one workstation is configured to receive information input by the workstation user. The at least one workstation, the server and a network comprise a first communications channel.

Furthermore, the system includes at least one merchant system operationally coupled to the at least one workstation. The at least one merchant system is operable to generate and transmit authentication requests and to complete the at least one transaction when the identity of the workstation user is validated. Additionally, the system includes an authentication system including an authentication database. The authentication system is configured to communicate with the server, to store within the authentication database biometric authentication data associated with each of a plurality of authorized users, to store an authentication policy, and to conduct a biometric authentication process over a second communications channel.

The system also includes a communications device included in the second channel. The communications device is operable to transmit a biometric authentication request over the second communications channel to the authentication system to initiate the biometric authentication process, to communicate with the authentication system over the second communications channel, to receive a biometric authentication data capture request transmitted over the second communications channel from the authentication system, to obtain biometric authentication data in accordance with the biometric authentication data capture request from the workstation user and transmit the obtained biometric data to the authentication system over the second communications channel. The communications device is not operable to store the obtained biometric data, and the one authorized user is associated with information inputted by the workstation user.

The at least one workstation is further operable to cause a security application stored in the communications device to be invoked after receiving a biometric authentication request. The authentication system is further operable to determine a state of the communications device when the inputted information is known, to transmit the biometric authentication data capture request corresponding to the level of risk of the at least one transaction, to validate the identity of the user by comparing the obtained biometric data against biometric authentication data of the one authorized user, and generate and transmit a one-time pass-phrase over the second communications channel when the workstation user is authenticated as the one authorized user.

The communications device is further operable to display the at least one transaction, to receive and display the one-time pass-phrase such that the one-time pass-phrase can be inputted into the at least one workstation and transmitted over the first communications channel to the authentication system. The authentication system is further operable to compare the one-time pass-phrase transmitted from the authentication system against the one-time pass-phrase received by the authentication system, and at least one of the server and the merchant system is operable to conduct the at least one transaction when the one-time pass-phrase transmitted from the authentication system matches the one-time pass-phrase received by the authentication system.

In yet another aspect, a method of authenticating users to reduce transaction risks is provided. The method includes storing biometric authentication data for each of a plurality of authorized users in an authentication system, and storing server data in a server. The authentication system is different than the server and the server is included in a first communications channel. The method also includes indicating a desire to conduct at least one transaction, determining whether the desired at least one transaction requires access to the protected resources and when the at least one transaction requires access to protected resources, inputting information in a workstation. A workstation user performs the indicating and inputting operations at the workstation.

Moreover, the method includes determining whether the inputted information is known and determining a state of a communications device when the inputted information is known, determining a level of risk for the at least one transaction, and transmitting an authentication request including the level of risk from the server over the first communications channel to the workstation when the state of the communications device is enrolled. Furthermore, the method includes prompting the workstation user to invoke a security application stored in the communications device, transmitting the biometric authentication request to the authentication system, extracting the level of risk from the biometric authentication request, and determining a biometric authentication data requirement corresponding to the extracted level of risk. Additionally, the method includes determining an authentication capture level corresponding to the biometric authentication data requirement for the at least one transaction, and communicating a biometric authentication data capture request to the communications device. The biometric authentication data capture request includes at least the biometric authentication capture level.

The method also includes invoking a capture level security application in the communications device and inputting the authentication capture level in the communications device such that the communications device displays the biometric authentication data requirement for the at least one transaction. Moreover, the method includes obtaining biometric authentication data in accordance with the biometric authentication capture request from the workstation user with the communications device, and transmitting the obtained biometric authentication data from the communications device to the authentication system over the second communications channel. Furthermore, the method includes validating the identity of the user by comparing the obtained biometric authentication data against biometric authentication data of the one authorized user stored in the authentication system, and conducting the at least one transaction when the captured biometric data and the biometric authentication data of the one authorized user match.

BRIEF DESCRIPTION OF THE DRAWINGS

FIG. 6 is a diagram illustrating an exemplary authentication policy associating the levels of risk illustrated in FIGS. 4 and 5 to biometric authentication data requirements;

FIG. 7 is a diagram illustrating exemplary risk factors and associated level of risk adjustments;

DETAILED DESCRIPTION OF THE INVENTION

Figure 1:
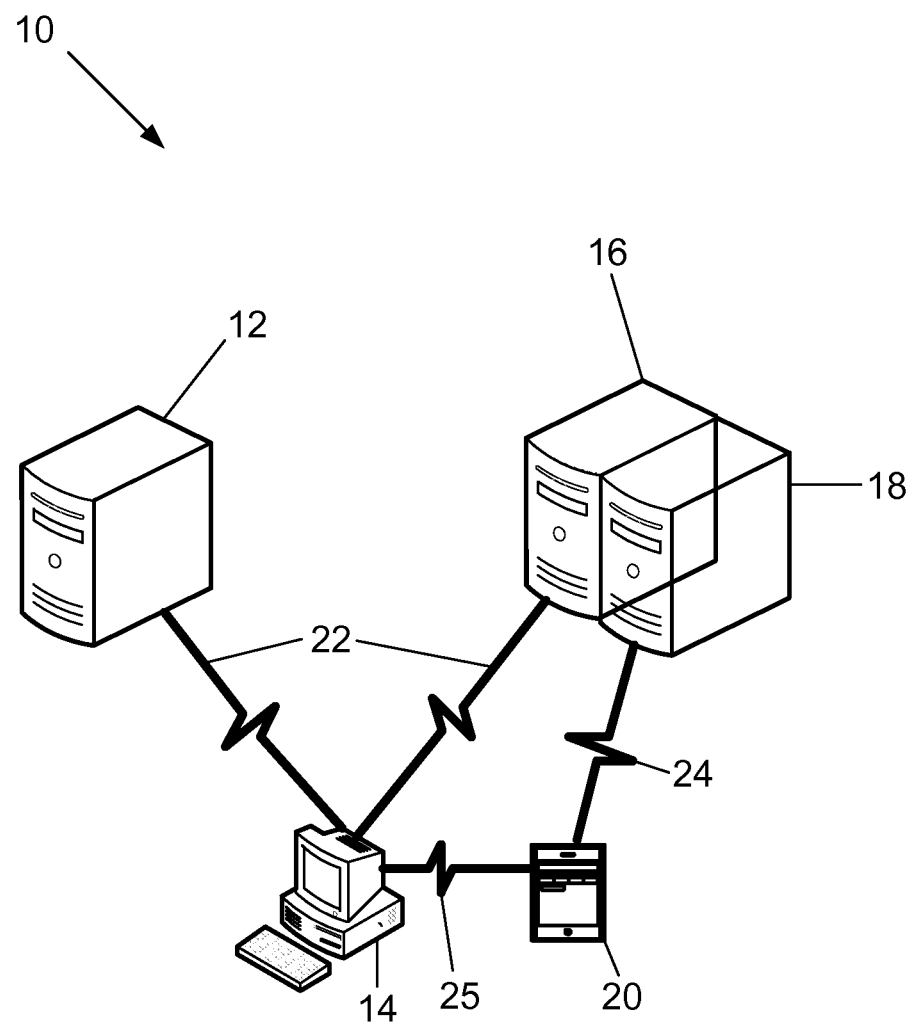
FIG. 1 is a block diagram of an exemplary embodiment of an Authentication Computer (AC) System for reducing network-based transaction risks.

FIG. 1 is an expanded block diagram of an exemplary embodiment of a system architecture of an Authentication Computer (AC) System 10 for authenticating the identity of a user to increase security of network-based transactions and thereby reduce risks associated with network-based transactions. More specifically, the AC system 10 includes a merchant server system 12, at least one workstation 14, a Service Provider Computer (SPC) System 16, a Biometric Authentication Computer (BAC) System 18 and a portable communications device 20.

In the exemplary embodiment, the merchant server system 12 includes components such as, but not limited to, a web server, a database server, an application server, a directory server and a disk storage unit arranged to be combined in a single structure. The disk storage unit may be used to store any kind of data. Although these components are combined to form a single structure in the form of the merchant server system 12 in the exemplary embodiment, it should be appreciated that in other embodiments these components may be separately positioned at different locations and operatively coupled together in a network such as, but not limited to, a local area network (LAN), a wide area network (WAN) and the Internet. The merchant server system 12 is typically configured to be communicatively coupled to end users at the workstation 14 using a communications network 22 such as, but not limited to, a LAN, a WAN and the Internet. Optionally, the merchant server system 12 may be communicatively coupled to the SPC system 16 using the network 22. The network 22 may include any combination of a LAN, a WAN and the Internet. It should be understood that any workstation end user at the workstation 14 may communicate with a web site of the merchant server system 12. Moreover, the merchant server system 12 is operable to generate and transmit authentication requests when a workstation end user attempts to conduct an electronic payment transaction. When the identity of the workstation end user is validated, the merchant server system 12 is operable to complete the electronic payment transaction. In the exemplary embodiment, the merchant server system 12 is a computer system of a commercial entity that requires validation of an end user at the workstation 14 in order to complete an electronic payment transaction.

In the exemplary embodiment, the SPC system 16 includes components such as, but not limited to, a web server, a database server, an application server, a directory server and a disk storage unit arranged to be combined in a single structure. The disk storage unit may be used to store any kind of data. Although these components are combined to form a single structure in the form of the SPC system 16 in the exemplary embodiment, it should be appreciated that in other embodiments these components may be separately positioned at different locations and operatively coupled together in a network such as, but not limited to, a local area network (LAN), a wide area network (WAN) and the Internet. The SPC system 16 is typically configured to be communicatively coupled to end users at the workstation 14 using the communications network 22, and to be communicatively and logically coupled to the BAC system 18. It should be understood that any authorized workstation end user at the workstation 14 can communicate with the SPC system 16.

In the exemplary embodiment, the SPC system 16 is a computer system of a financial institution service provider used to store and manage financial data for a plurality of authorized users, and to protect access to the financial data. Although the financial business is the example business described herein, the invention is in no way limited to the financial business. Thus, it should be appreciated that in other embodiments, the SPC system 16 may be associated with any commercial entity service provider or governmental entity service provider that stores confidential information and data generally corresponding to the business or everyday operations of the entity, and that controls access to the confidential information and data. Although the exemplary embodiment is described as including one SPC system 16 corresponding to a financial institution service provider, it should be appreciated that in other embodiments a plurality of SPC systems 16 may be provided such that each of the plurality of SPC systems 16 is associated with a different service provider. The SPC system 16 and the merchant server system 12 are associated with different commercial entities in the exemplary embodiment. However, in other embodiments the SPC system 16 and merchant server system 12 may be associated with the same commercial or governmental entity.

It should be understood that in the exemplary embodiment the SPC system 16 is operable to store therein a different unique user identifier for each authorized user such that each unique user identifier is associated with the financial data of a respective authorized user. The SPC system 16 is also operable to store therein biographic data for each authorized user such that the biographic data is associated with the unique user identifier of a respective authorized user. Moreover, it should be appreciated that when a plurality of SPC systems 16 are provided, each authorized user is associated with the same unique user identifier in each of the different SPC systems 16. It should also be appreciated that the different SPC systems 16 may be associated with service providers such as, but not limited to, hospitals, governmental agencies and educational institutions. Thus, for example, an authorized user associated with a hospital service provider and an educational institutional service provider will have a unique user identifier for the hospital that is the same as the unique user identifier for the educational institution.

Moreover, the SPC system 16 stores configurable policies for associating a level of risk with network-based transactions that may require access to protected resources, and that identify risk factors associated with conducting network-based electronic payment transactions. The SPC system 16 may also store a security application therein. Furthermore, the SPC system 16 is operable to generate and transmit authentication requests when a workstation end user attempts to conduct a network-based electronic payment transaction or conduct a network-based transaction that requires access to protected resources. In the exemplary embodiment, the authentication requests are transmitted to the BAC system 18 and include at least a request that the BAC system 18 authenticate the identity of a workstation end user.

Protected resources include any kind of resource or data that is protected against access by unauthorized users. Such resources include, but are not limited to, electronic artifacts, services and applications. It should be understood that electronic artifacts include items such as, but not limited to, web documents. Services include, but are not limited to, checking-out an electronic shopping cart at a website and conducting a payment transaction. Applications as described herein may be any kind of computer program that causes a computer, a computer processor, or a computer system to execute the program, and thus causes the computer to perform a function. For example, applications as described herein may include, but are not limited to, applications that facilitate performing privileged communications and applications that permit access to privileged information. It should be understood that such protected applications are made available to a user only upon validation of the identity of the user. Moreover, it should be understood that by virtue of protecting the applications, the functions performed by those applications are also protected. Thus, by virtue of granting access to protected applications upon validation of the identity of the user, access is also granted to the functions performed by those applications. Consequently, it should be appreciated that functions caused to be performed on a computer or computer system by applications stored throughout the AC system 10, also constitute protected resources.

It should be understood that data considered to be protected resources includes, but is not limited to, confidential financial and health data records, data inherent in an e-mail, data stored in an electronic file system, and data inherent in any kind of electronic communications. Consequently, because the data stored in the SPC system 16 is protected against access by unauthorized users, the data stored in the SPC system 16 is a protected resource. It should be understood that each protected resource stored in the SPC system 16 may be associated with at least a corresponding one of the plurality of authorized users.

It should be appreciated that protected resources may take any form and be accessed in any manner. For example, a protected resource may be a box containing a million dollars that is stored in a room. The room may have a door with an electronic lock system configured to communicate with the SPC system 16 and the BAC system 18, that is capable of reading a smart card to input a unique user identifier of an individual attempting to gain access. Such an electronic lock system may facilitate authenticating an individual to reduce risks that a transaction involving removing the protected resource from the room is not conducted fraudulently. Upon properly validating the identity of the individual the electronic lock system opens the door to permit access to the protected resource.

In the exemplary embodiment, the BAC system 18 includes components such as, but not limited to, a web server, a disk storage device, a database management server and an authentication server arranged to be combined into a single structure. Although these components are combined into a single structure in the exemplary embodiment, it should be appreciated that in other embodiments these components may be separately positioned at different locations and operatively coupled together in a network such as, but not limited to, a LAN, a WAN and the Internet. The disk storage device may be used for storing any kind of data including, but not limited to, enrollment data records of individuals, unique user identifiers, and one-time pass-phrases (OTPP). The database management server may be used to facilitate transferring data to and from the disk storage device. The authentication server is configured to perform matching of any feature or information associated with individuals to validate the identity of the individuals as described herein.

The BAC system 18 is configured to be communicatively and logically coupled to the SPC system 16, and to be wirelessly communicatively coupled to the communications device 20 over a communications network 24. Moreover, the BAC system 18 is operable to facilitate reducing network-based transaction risks by authenticating identities of workstation users requesting to conduct such network-based transactions. In the exemplary embodiment, the communications network 24 is a 3G communications network. However, it should be appreciated that in other embodiments the communications network 24 may be any wireless network that facilitates authentication as described herein, such as, but not limited to, W-Fi, Global System for Mobile (GSM) and Enhanced Data for GSM Environment (EDGE). Although the BAC system 18 is communicatively coupled to a single SPC system 16 in the exemplary embodiment, it should be appreciated that in other embodiments the BAC system 18 may be configured to be communicatively coupled to a plurality of SPC systems 16.

The BAC system 18 is operable to store authentication data. In the exemplary embodiment, the authentication data is biometric data that corresponds to any biometric type desired to be used as the basis of validating the identity of an end user at the workstation 14. Thus, the BAC system 18 is operable to store biometric authentication data and is operable to use the biometric authentication data to validate identities of users desiring to conduct network-based electronic payment transactions and transactions that require accessing the protected resources stored in the SPC system 16. Using biometrics as the basis for validating identities facilitates enhancing trust in the validation result. In order to facilitate properly validating identities of workstation users desiring to conduct network-based electronic payment transactions and network-based transactions that require accessing protected resources, in the exemplary embodiment the BAC system 18 stores biometric authentication data in the form of enrollment data records for each of the plurality of authorized users. In the exemplary embodiment, biometric data corresponding to any biometric type may be obtained and stored as enrollment data records in the BAC system 18. Such biometric types include, but are not limited to, face, fingerprint, iris, voice, vascular patterns and hand signatures. Moreover, the biometric data may take any form such as, but not limited to, images, photographs, templates and electronic data representations.

Although the enrollment data records include biometric data in the exemplary embodiment, it should be appreciated that in other embodiments the enrollment data records may include any kind of authentication data including, but not limited to, biographic data, and may include any combination of authentication data for each authorized user. Moreover, it should be appreciated that in other embodiments the enrollment data records may include biographic data, in addition to the biometric data, for each authorized user that is associated with the authorized user's biometric data.

The BAC system 18 also stores a configurable authentication policy that assigns authentication data requirements to different types of network-based transactions commensurate with an identified level of risk. The BAC system 18 may store additional authentication policies therein which are used to determine data that is to be obtained from a user attempting to enroll in the BAC system 18. Moreover, the additional authentication policies may be used to determine data to be obtained from a workstation user attempting to conduct a network-based transaction. Furthermore, the additional authentication policies may be used to determine a level of risk associated with a transaction. Additionally, the BAC system 18 is operable to generate and transmit authentication data capture requests to at least the communications device 20. It should be understood that an authentication data capture request includes at least an authentication data requirement, determined by the BAC system 18, that is to be obtained from the workstation user attempting to conduct a network-based transaction.

The term "biographic data" as used herein includes any demographic information regarding an individual as well as contact information pertinent to the individual. Such demographic information includes, but is not limited to, an individual's name, age, date of birth, address, citizenship and marital status. Contact information collected in the exemplary embodiment includes devices and methods for contacting the authorized user, or customer. Specifically, in the exemplary embodiment, customers designate a particular communications device used by the customer and provide information regarding the designated communications device that facilitates validating the designated communications device as known, facilitates communicating with the authorized user and facilitates validating the identity of the authorized user. Such information includes, but is not limited to, a communications device identifier of the designated communications device, a telephone number associated with the designated communications device, an e-mail address that can be accessed using the designated communications device, an instant messaging user identifier that can be accessed or an identifier that facilitates sending short message service (SMS) messages to the designated communications device.

The information regarding the designated communications device is stored in the BAC system 18 and is associated with the authorized user, or customer, of the designated device in the BAC system 18. Thus, it should be appreciated that the communications device identifier is stored in the BAC system 18 such that the communications device identifier is associated with the unique user identifier of the authorized user. Additionally, a state of the communications device 20 may be stored in the BAC system 18 such that the state of the device 20 is associated with the designated communications device information. It should be appreciated that the SPC system 16 may also store therein the communications device identifier such that the communications device identifier may be associated with the unique user identifier of the authorized user in the SPC system 16. It should be understood that in the exemplary embodiments described herein the portable communications device 20 is the designated communications device.

Although the authentication data is described as biometric data in the exemplary embodiment, it should be appreciated that in other embodiments any other type of authentication data, or combinations of different types of authentication data, may be used that facilitates validating the identity of a user as described herein. Such other types of authentication data include, but are not limited to, Global Positioning System (GPS) coordinates, unique pass-phrases, a combination of biometric data with GPS coordinates, a combination of biometric data with a unique pass-phrase, a combination of GPS coordinates with a unique pass-phrase, and a combination of biometric data with GPS coordinates and a unique pass-phrase.

GPS coordinates may be determined for any GPS enabled device used by an authorized user to communicate with the BAC system 18 and may be stored in the BAC system 18 as coordinate data. For example, GPS coordinate data may be determined for workstation 14 and stored in the BAC system 18 as home address coordinate data. A geographical area may be established relative to the home address coordinate data such that when the designated communications device is determined to be outside of the geographical area, verification of a user desiring to conduct an electronic payment transaction or a transaction requiring access to the protected resources stored in the SPC system 16 does not occur. However, when the designated communications device is determined to be within the geographical area, the identity of the user desiring to conduct the transaction may be validated such that the user is permitted to conduct the electronic payment transaction, or may be validated as the authorized user having access to the protected resources required to conduct the transaction. It should be appreciated that the geographical area may be a circle, centered about the home address coordinate data, having a radius based on behavior of the authorized user. For example, an authorized user having a fifty mile one-way commute to work may have a radius corresponding to the commute distance, that is, fifty miles. However, it should be appreciated that the radius may be determined by any kind of user behavior and may be any corresponding distance. Moreover, it should be appreciated that the geographical area may have any shape and size that facilitates validating the identity of a user as described herein. Although the example discussed herein uses the location of the workstation 14 to determine the home address coordinate data, it should be appreciated that the home address coordinate data may be the GPS coordinate data of any device, or combination of devices.

Unique pass-phrases may also be established for each authorized user and stored in the BAC system 18 such that a user desiring to conduct a network-based electronic payment transaction, or a network-based transaction that requires accessing the protected resources stored in the SPC system 16, provides the unique pass-phrase for authentication.

In the exemplary embodiment the SPC system 16 and the BAC system 18 are positioned together at the same location and communicate over a network substantially identical to the network 22. However, in other embodiments, the SPC system 16 and the BAC system 18 may be positioned at different locations and communicate over a network substantially identical to the network 22. For example, the SPC system 16 may be located at the place of business of the service provider in Reston, Va. while the BAC system 18 may be located at the place of business of a biometric authentication company in Austin, Tex. When the SPC system 16 and the BAC system 18 are separately located, the SPC system 16 is generally an existing corporate or governmental entity service provider computer system that does not include adequate authentication capabilities, and the BAC system 18 is an authentication system operable to quickly connect to, and provide adequate authentication capabilities to, the SPC system 16. By accessing the BAC system 18, the SPC system 16 is able to secure adequate authentication capabilities without purchasing hardware and software to implement authentication capabilities, and without incurring costs associated with training employees to use the hardware and software. Consequently, the BAC system 18 may facilitate quickly and inexpensively retrofitting existing computer systems to provide rigorous identity authentication. Thus, it should be appreciated that as described herein, the SPC system 16 and the BAC system 18 are different and are not the same device or system. Moreover, it should be appreciated that when the BAC system 18 and the SPC system 16 are positioned at different locations, the BAC system 18 may be communicatively coupled with a plurality of other SPC systems 16 associated with other service providers, such as medical service providers, that conduct network-based transactions requiring rigorous identity authentication.

The workstation 14 is configured to be communicatively coupled to SPC system 16 via the communications network 22 and may wirelessly communicate with at least the communications device 20 over a network 25. The workstation 14 includes devices, such as, but not limited to, a CD-ROM drive for reading data from computer-readable recording mediums, such as a compact disc-read only memory (CD-ROM), a magneto-optical disc (MOD) and a digital versatile disc (DVD). Moreover, the workstation 14 includes a display device, such as, but not limited to, a liquid crystal display (LCD), a cathode ray tube (CRT) and a color monitor. Furthermore, the workstation 14 includes a printer and input devices such as, but not limited to, a mouse (not shown), keypad (not shown), a keyboard, a camera (not shown) and a microphone (not shown). Although a single workstation 14 is described in the exemplary embodiment, it should be appreciated that any number of workstations 14 may be configured to be communicatively coupled to the SPC system 16 and to wirelessly communicate with at least the communications device 20. In the exemplary embodiment, the network 25 operates using the Bluetooth wireless communications standard. However, in other embodiments the network 25 may operate using any wireless communications standard that facilitates authentication as described herein. It should be appreciated that authorized workstation users as used herein also refers to customers.

The communications device 20 is configured to wirelessly communicate with at least the BAC system 18 over the network 24 and wirelessly communicate with the workstation 14 over the network 25. Moreover, in the exemplary embodiment, the communications device 20 is operable to obtain authentication data from users desiring to conduct a network-based electronic payment transaction, or a network-based transaction that requires accessing the protected resources stored in the SPC system 16. The communications device 20 includes at least one of buttons and icons operable to at least enter commands, enter data and invoke applications stored therein. Moreover, the communications device 20 includes a display screen such as, but not limited to, a Liquid Crystal Display (LCD), and is operable to display any text or image on the display screen. In the exemplary embodiment, the communications device 20 is a portable cellular phone operable to at least display messages and images, obtain authentication data from a user, and transmit the obtained authentication data to the BAC system 18.

Although the device 20 is a portable cellular phone in the exemplary embodiment, it should be appreciated that in other embodiments the communications device 20 may be any portable communications device capable of at least displaying messages and images, and obtaining and transmitting data. Such other portable communications devices include, but are not limited to, a smart phone, and any type of portable communications device having wireless capabilities such as a personal digital assistant (PDA) and a laptop computer. Moreover, it should be appreciated that in the exemplary embodiment the communications device 20 is used to obtain the authentication data stored as enrollment data records in the BAC system 18. Furthermore, authentication data obtained during identity validation is obtained using the communications device 20 in the exemplary embodiment. It should be appreciated that in other embodiments the enrollment data records may be obtained in any manner that facilitates validating the identity of users as described herein, including, but not limited to, loading the required authentication data into the BAC system 18 from external identity management systems or human resource management systems.

Although the communications device 20 is operable to obtain biometric data during identity validation in the exemplary embodiment, it should be appreciated that in other embodiments the communications device 20 may be operable to obtain any type of data that facilitates validating the identity of a user desiring to conduct a network-based electronic payment transaction or a transaction that requires access to the protected resources. Such other types of data include, but are not limited to, GPS coordinates and unique pass-phrases. Thus, in other embodiments, the communications device 20 may be configured to determine the GPS coordinates of the device 20 and transmit the GPS coordinates to the BAC system 18. By determining the GPS coordinates of the device 20 and transmitting the GPS coordinates of the device 20 to the BAC system 18, the GPS coordinates of the device 20 may be compared against the geographical area to determine whether the identity of the user desiring to conduct the transaction may be authenticated. It should be understood that in the exemplary embodiment, although the biometric data is obtained with the communications device 20 during identity validation, the biometric data is not stored in the communications device 20. Instead, the communications device 20 transmits the obtained biometric data to the BAC system 18 and the BAC system 18 stores the obtained biometric data. However, it should be appreciated that in other embodiments, when data different than biometric data is obtained during validation, the different data may be stored in the communications device 20.

The communications device 20 is also operable to store the configurable authentication policies therein that may be used to at least determine the level of risk associated with a network-based transaction and to determine which authentication data to obtain from a workstation user attempting to conduct a network-based transaction.

The merchant server system 12, the SPC system 16, the BAC system 18, the communications device 20, and the workstation 14 each include a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processors execute instructions, or computer programs, stored in the memories (not shown) of the merchant server system 12, the SPC system 16, the BAC system 18 the communications device 20 and the workstation 14, respectively. The above examples are exemplary only, and are thus not intended to limit in any way the definition and/or meaning of the term "processor."

The memories (not shown) in the merchant server system 12, the SPC system 16, the BAC system 18, the communications device 20 and the workstation 14, can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

Each memory (not shown) can be a computer-readable recording medium used to store data in the merchant server system 12, the SPC system 16, the BAC system 18, the communications device 20 and the workstation 14, and store computer programs or executable instructions that are executed by the merchant server system 12, the SPC system 16, the BAC system 18, the communications device 20 and the workstation 14. Moreover, the memory (not shown) may include smart cards, SIMs or any other medium from which a computing device can read computer programs or executable instructions. As used herein, the term "computer program" is intended to encompass an executable program that exists permanently or temporarily on any computer-readable recordable medium that causes the computer or computer processor to execute the program.

It should be appreciated that the at least one workstation 14, the network 22, the SPC system 16, and the communication network between the SPC system 16 and the BAC system 18, together constitute a first communications channel. Moreover, it should be appreciated that the communications network 24 and the communications device 20 together constitute a second communications channel separate and distinct from the first communications channel. Attackers that are able to monitor communications and phish for user names and passwords over the first communications channel are not aware of the second communications channel, and thus cannot monitor communications and phish over the second channel. As a result, security of network-based transactions is facilitated to be increased and ease of integration with existing legacy systems is facilitated to be enhanced.

Figure 2:
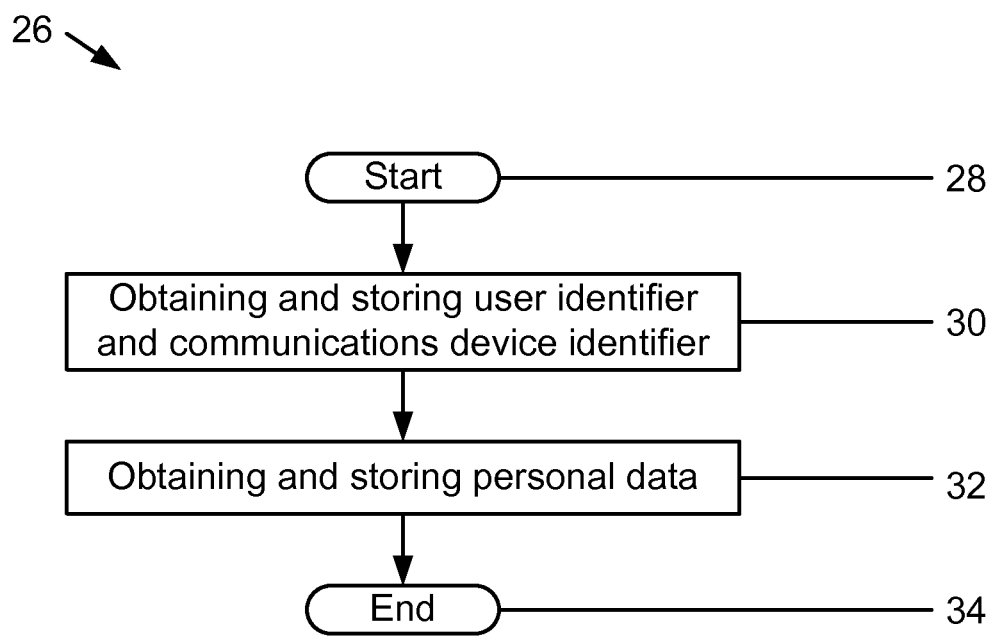
FIG. 2 is a flowchart illustrating an exemplary process of enrolling a user in a computer system of a service provider.

FIG. 2 is a flowchart 28 illustrating an exemplary process for enrolling an authorized user in the SPC system 16. After purchasing a communications device 20 an authorized user communicates with the SPC system 16 to enroll therein. The enrolling process starts 30 by obtaining 32 a unique user identifier from the authorized user and obtaining the communications device identifier of the communications device 20 of the authorized user. The SPC system 16 stores 32 the unique user identifier therein such that the unique user identifier is associated with the protected resources of the authorized user. After obtaining 32 and storing 32 the unique user identifier, the required biographic data of the user is obtained 34 and stored 34 in the SPC system 16 such that the biographic data is associated with the corresponding unique user identifier. Next, processing ends 36.

In the exemplary embodiment, after enrolling in the SPC system 16, the user registers the device 20 in the BAC system 18 prior to conducting a first transaction. Specifically, the communications device identifier of the communications device 20 is stored in the BAC system 18, and a state of the communications device 20 is set as not enrolled such that a non-enrolled state is associated with the communications device identifier in the BAC system 18. By virtue of storing the communications device identifier and associating the communications device identifier with the non-enrolled state in the BAC system 18, the communications device 20 is registered in the BAC system 18. Although the communications device 20 is registered prior to conducting the first transaction in the exemplary embodiment, it should be appreciated that in other embodiments the device 20 may be registered at the time an individual indicates a desire to conduct the first transaction. In such other embodiments the device 20 is registered immediately before conducting the first transaction. After registering the device 20, the first transaction may be conducted.

Figure 3:
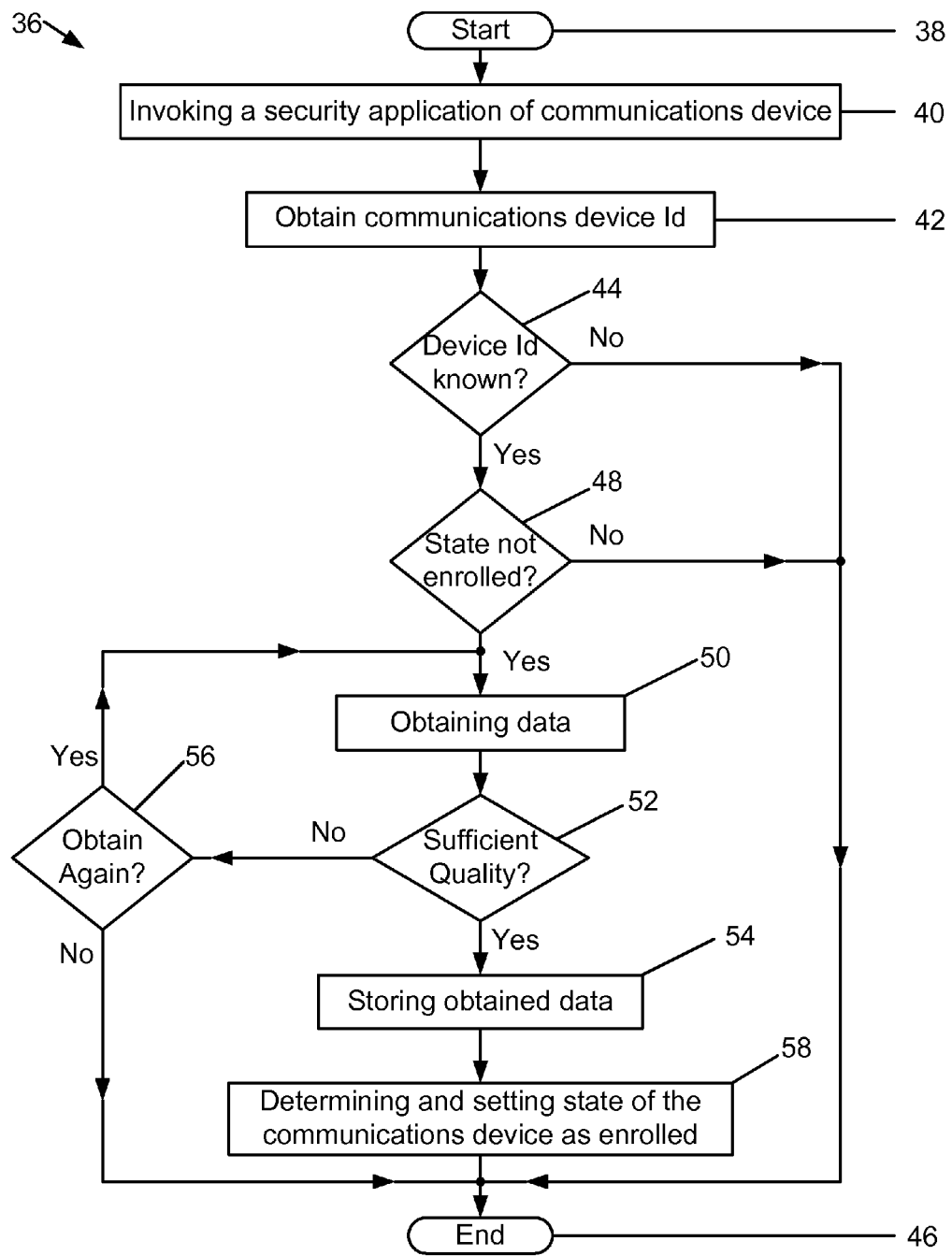
FIG. 3 is a flowchart illustrating an exemplary process for enrolling a communications device in an authentication system included in the AC System illustrated in FIG. 1.

FIG. 3 is a flowchart 36 illustrating an exemplary process for enrolling a communications device 20 in the BAC system 18. The process starts 38 by navigating to the web site of the financial institution service provider and indicating a desire to enroll the communications device 20. In response, the SPC system 16 contacts the BAC system 18 and notifies the BAC system 18 that a communications device 20 is to be enrolled therein. Next, the SPC system 16 causes a message to be displayed on the financial institution web site instructing the user to start the enrollment process by invoking 40 a security application stored in the communications device 20 by activating an icon or button of the communications device 20. In the exemplary embodiment, the security application is stored in the device 20 upon purchasing the device 20. However, it should be appreciated that in other embodiments the security application may not be stored in the device 20. In such other embodiments, the security application may be stored in the SPC system 16 or may be obtained from an online store using the SPC system 16. Consequently, in such other embodiments the device 20 may communicate with the SPC system 16 to obtain the security application from the SPC system 16.

After invoking 40 the security application, the communications device identifier of the communications device 20 is obtained 42. Next, the communications device 20 initiates communications with the BAC system 18 and transmits the communications device identifier to the BAC system 18. After receiving the communications device identifier, the BAC system 18 determines whether or not the communications device 20 is known 44. Specifically, the BAC system 18 compares the received communications device identifier against the communications device identifiers stored therein, and determines that the communications device 20 is known 44 when the received communications device identifier matches one of the communications device identifiers stored therein. When the received communications device identifier does not match one of the communications device identifiers stored in the BAC system 18, the communications device 20 is not known 44 and processing ends 46.

When the received communications device identifier is determined to be known processing continues by determining the state 48 associated with the one matching communications device identifier. Specifically, the BAC system 18 determines whether the state of the one matching communications device identifier is not enrolled. When the one matching communications device identifier is enrolled 48, processing ends 46. However, when the one matching communications device identifier is not enrolled 48 processing continues by obtaining 50 the unique user identifier, the identity of the financial institution service provider, and required biometric data of the user associated with the communications device 20, and determining whether the obtained biometric data is of sufficient quality 52 to be used for authenticating the identity associated with the communications device 20. It should be appreciated that the BAC system 18 determines which biometric data is to be obtained in accordance with the configurable authentication policies, or rules, stored therein. When the obtained biometric data is of sufficient quality 52, processing continues by storing 54 the obtained biometric data in the BAC system 18 as an enrollment data record, such that the biometric data enrollment record is associated with the one matching communications device identifier. Moreover, the unique user identifier and financial institution service provider identity are stored 54 in the BAC system 18 such that the unique user identifier and the financial institution service provider identity are associated with the one matching communications device identifier and enrollment data record. Thus, the unique user identifier and financial institution service provider identity are also associated with the one matching communications device identifier.

When the obtained biometric data is not of sufficient quality 52, the biometric data may be obtained again 56 in an effort to obtain biometric data of sufficient quality to use for authenticating identities as described herein. In the exemplary embodiment, biometric data corresponding to the required biometric data may be obtained six times. When acceptable biometric data is not obtained 56 after six attempts biometric data is no longer obtained, instead, processing ends 46. However, it should be appreciated that in other embodiments biometric data may be obtained 54 any number of times that facilitates authenticating identities as described herein, or until sufficient quality levels are achieved.

Although processing ends 46 in the exemplary embodiment when acceptable biometric data is not obtained 56 after six attempts, it should be appreciated that in other embodiments after six attempts alternative different biometric data may be obtained 50. Moreover, it should be appreciated that in other embodiments any number of different alternative biometric types, as well as any combination of different biometric types, may be obtained as the required biometric data and used for authenticating identities as described herein.

After obtaining biometric data of sufficient quality 52 and storing 54 the obtained biometric data and user unique identifier, processing continues by determining that the state of the communications device 20 is enrolled 58. It should be appreciated that in the exemplary embodiment, by storing 54 the enrollment data records and unique user identifier of the user in the BAC system 18 and by associating the enrollment data records and unique user identifier with the one matching communications device identifier in the BAC system 18, the communications device 20 is determined to be enrolled in the BAC system 18 and the device 20 is determined to have an enrolled state 58. Thus, in the exemplary embodiment the state of the communications device 20 in the BAC system 18 is set as enrolled 58. After setting 58 the state of the communications device 20, processing ends 46.

It should be appreciated that in the exemplary embodiment the time between registering the communications device 20 in the BAC system 18 and enrolling the communications device 20 in the BAC system 18 may vary. For example, immediately after registering the communications device 20 in the BAC system 18 the user may elect to enroll the communications device 20 in the BAC system 18 according to the process described herein and as illustrated in FIG. 3. In contrast, after registering the communications device 20 in the BAC system 18 the user may elect to enroll the communications device 20 at a later more convenient time. When the user elects to enroll the communications device 20 at a later time, the communications device 20 is enrolled according to strict guidelines that require enrolling the communications device 20 within 4 minutes of registration. However, in other embodiments, it should be appreciated that the guidelines may require enrolling the communications device 20 within any time of registration that facilitates ensuring that the biometric data and unique user identifier are not obtained from an imposter. Moreover, in other embodiments the guidelines may require enrolling the communications device 20 according to any standard that ensures the biometric data and unique user identifier are not obtained from an imposter.

Although the identity of a financial institution service provider is obtained from the user during enrollment in the BAC system 18 in the exemplary embodiment, it should be appreciated that in other embodiments the identities of a plurality of different service providers may be obtained and associated with the unique user identifier in the BAC system 18. That is, the user may provide the identities of a plurality of different service providers that are to be stored in the BAC system 18 and are to be associated with the same unique user identifier in the BAC system 18. It should be appreciated that each different service provider has a corresponding SPC system 16 that stores therein at least unique user identifiers and corresponding protected resources of respective authorized users. Thus, it should be understood that in other embodiments by virtue of the unique user identifier being associated with each of the different service provider identities, the BAC system 18 may be associated with each of the corresponding SPC systems 16 such that the BAC system 18 is able to determine the SPC systems 16 to communicate with for each user.

Although the BAC system 18 determines the state of the communications device 20 in the exemplary embodiment, it should be appreciated that in other embodiments the state of the communications device 20 may be determined by at least the SPC system 16, the communications device 20 and the workstation 14.

In the exemplary embodiment, the communications device identifier and the unique user identifier are stored in the BAC system 18 such that the communications device identifier and the unique user identifier are associated with the enrollment data record of the authorized user stored in the BAC system 18. It should be understood that by virtue of associating the unique user identifier with the protected resources in the SPC system 16, and associating the unique user identifier with the enrollment data record of the authorized user stored in the BAC system 18, the unique user identifier functions to map data stored in the SPC system 16 associated with the unique user identifier to data stored in the BAC system 18 associated with the same unique user identifier. Thus, it should be appreciated that in the exemplary embodiment information stored in the SPC system 16 facilitates mapping between data stored in the SPC system 16 and data stored in the BAC system 18.

Figure 4:
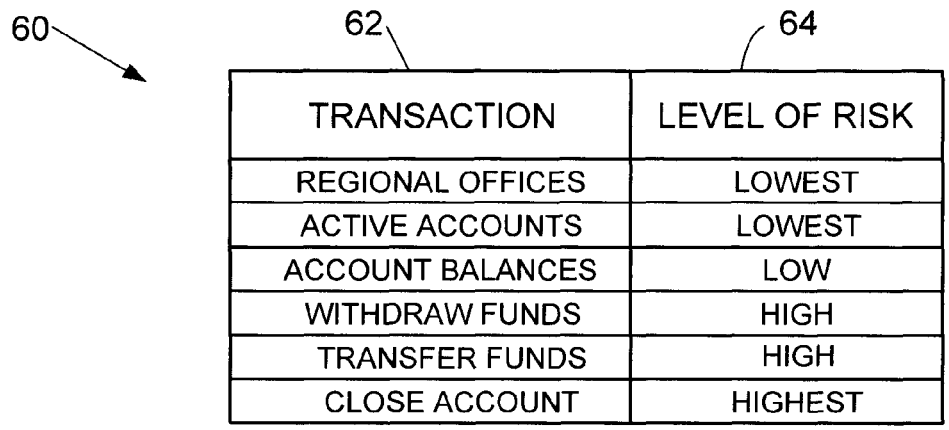
FIG. 4 is a diagram illustrating a first exemplary configurable policy associating network-based transactions with levels of risk.

FIG. 4 is a diagram illustrating a first exemplary configurable policy 60 that is stored in the SPC system 16 and is for associating a level of risk with each type of network-based transaction 62 that may require access to protected resources. Specifically, the policy 60 includes different types of network-based transactions 62 requested by a user and a corresponding level of risk 64 such that each network-based transaction 62 that may require access to protected resources is associated with a level of risk 64. In the exemplary embodiment the network-based transactions 62 that may require access to protected resources include, but are not limited to, viewing regional office locations, viewing active accounts, viewing the active account balances, withdrawing funds from the active accounts, transferring funds from the active accounts and closing any of the active accounts. However, in other embodiments it should be appreciated that the network-based transactions 62 may be any appropriate transaction that may be conducted with any commercial entity.

The levels of risk 64 define categories or degrees of risk associated with a transaction 62 that vary from a highest level of risk 64 to a lowest level of risk 64. In the exemplary embodiment, transactions 62 that access a customer's active accounts, or that access regional office data of the financial institution, are considered to have a lowest level of risk. Consequently, a transaction 62 that accesses a customer's active accounts or regional office data is assigned a lowest level of risk 64. A transaction 62 that accesses the account balances of each of the active accounts warrants a greater degree of security because the account balances constitute privileged information. Thus, transactions 62 that access the account balances are assigned a low level of risk 64. A transaction 62 that withdraws funds from any of the active accounts warrants an even greater degree of security because preventing unauthorized withdrawals is a primary concern of the customer and a primary responsibility of the financial institution. Consequently, a transaction 62 that withdraws funds is assigned a high level of risk 64. A transaction 62 that closes an account is assigned a highest level of risk 64 because customers and financial institutions are concerned about unauthorized account closings.

It should be understood that in the exemplary embodiment the policy 60 is generated by associating each of the plurality of network-based transactions 62 with a corresponding one of the levels of risk 64. Moreover, it should be understood that in the exemplary embodiment, the policy 60 may be reconfigured by defining the types of transactions 62 and the levels of risk 64 in any desirable manner that facilitates validating the identity of a workstation user as an authorized user. Furthermore, the policy 60 may be reconfigured by changing the definitions of the transactions 62 and the levels of risk 64. Although the exemplary embodiment includes one configurable policy 60 stored in the SPC system 16, it should be appreciated that in other embodiments any number of configurable policies 60 may be generated and stored in the SPC system 16. That is, in other embodiments, additional configurable policies 60 may be included that are appropriate for other businesses or entities, such as, but not limited to, hospitals. Such additional policies 60 may include any transaction 62 appropriate for the business or entity, such as, but not limited to, transactions requesting a patient's medical history records.

It should be understood that as used herein, transaction risks are risks that information required to conduct a network-based electronic payment transaction or a transaction requiring access to protected resources may be surreptitiously obtained by an unauthorized workstation user, or unauthorized entity, and used by the unauthorized user to conduct fraudulent network-based transactions. Information to conduct a network-based electronic payment transaction or information required to access protected resources may be any type of identifier that may be used to verify the identity of an authorized user such as, but not limited to, unique user identifiers, pass-phrases, and credit card numbers. It should be appreciated that unique user identifiers and pass-phrases are character strings that may be any desired combination of letters, numbers, punctuation symbols and mathematical symbols.

Figure 5:
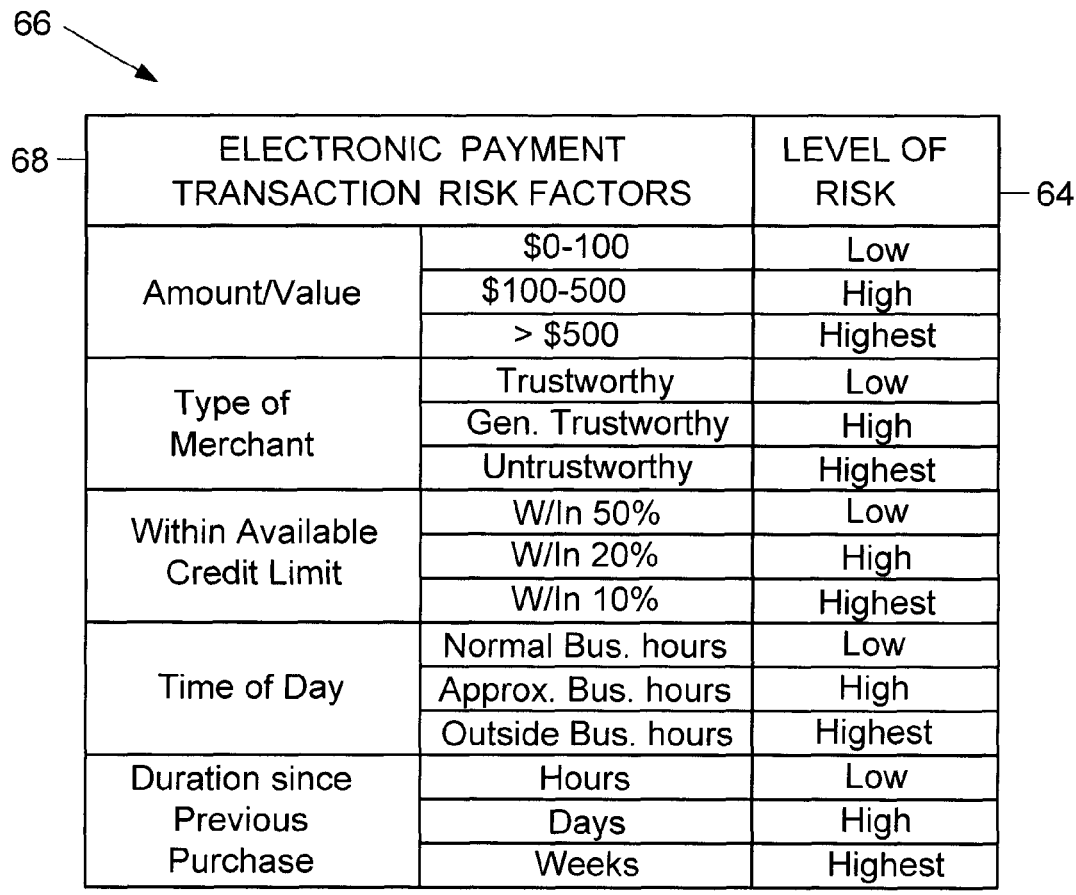
FIG. 5 is a diagram illustrating a second exemplary configurable policy relating network-based transaction risk factors to levels of risk.

FIG. 5 is a diagram illustrating a second exemplary configurable policy 66 that is stored in the SPC system 16 and is for associating each of the levels of risk 64 with a network-based electronic payment transaction risk factor 68. Specifically, the policy 66 includes a plurality of electronic payment transaction risk factors 68 and associates each risk factor 68 with a corresponding level of risk 64. Such risk factors 68 may include, but are not limited to, the amount or value of a purchase, the type of merchant, the amount of credit available to a purchaser, the time of day a purchase is made, and the duration since a previous purchase. Moreover, each of the electronic payment transaction risk factors 68 is divided into subcategories such that each subcategory is associated with a corresponding level of risk 64. For example, the value of a purchase may be divided into subcategories according to the amount of a purchase, such as $0-100, $100-500, and greater than $500. Each subcategory is assigned a corresponding level of risk 64. Consequently, an electronic payment transaction worth less than $100 may be associated with a low level of risk 64, an electronic payment transaction worth between $100 and $500 may be associated with a high level of risk 64, and an electronic payment transaction worth greater than $500 may be associated with a highest level of risk 64.

Similarly, the type of merchant risk factor 68 may be divided into subcategories according to a level of trust associated with each merchant such as trustworthy, generally trustworthy, and untrustworthy. A merchant may be considered trustworthy because the service provider has not encountered any electronic payment transaction problems with the merchant. A merchant may be considered generally trustworthy because the service provider has encountered at least some electronic payment transaction problems. A merchant may be considered untrustworthy because the service provider has encountered significant electronic payment transaction problems with the merchant. Consequently, a trustworthy merchant may be associated with a low level of risk 64, a generally trustworthy merchant may be associated with a high level of risk 64, and an untrustworthy merchant may be associated with the highest level of risk 64.

It should be understood that in the exemplary embodiment, the second exemplary configurable policy 66 may be configured by defining the electronic payment transaction risk factors and the associated levels of risk in any desirable manner that facilitates authenticating the identity of the workstation user as an authorized user. Moreover, the second exemplary configurable policy 66 may be configured by changing the definitions of the transaction risk factors 68 and the levels of risk 64.

It should be appreciated that any network-based electronic payment transaction may involve a plurality of the electronic payment transaction risk factors 68, and that a resultant level of risk 64 may be determined using the levels of risk 64 associated with each of the involved electronic payment transaction risk factors 68. The SPC system 16 compares the levels of risk 64 associated with each of the involved electronic payment transaction risk factors 68 and determines which risk factor 68 has the greatest level of risk 64. The greatest level of risk 64 is determined to be the resultant level of risk and is used as the basis for authenticating the workstation user. For example, when an electronic payment transaction for less than $100 is conducted with an untrustworthy merchant, the level of risk 64 associated with each of the involved electronic payment transaction risks 68 is determined as low and highest, respectively, by the SPC system 16. Because the level of risk 64 associated with an untrustworthy merchant, i.e., highest, is greater than the level of risk 64 associated with an electronic payment transaction worth less than $100, i.e., low, the resultant level of risk 64 is the level of risk 64 associated with the untrustworthy merchant, that is, the highest level of risk. Although the greatest level of risk associated with the payment transaction risk factors is determined to be the resultant level of risk in the exemplary embodiment, it should be appreciated that in other embodiments any other known technique may be used to combine a plurality of risk factors 68 to obtain an optimal overall risk rating, or optimal resultant level of risk.

FIG. 6 is a diagram illustrating an exemplary configurable authentication policy 70 that is stored in the BAC system 18, and is for associating each of the levels of risk 64 with a corresponding authentication data requirement 72. Specifically, the authentication policy 70 includes the same level of risk 64 definitions established in the first and second configurable policies 60 and 66, respectively, as well as an authentication data requirement 72 for use in validating the identity of a user. In the exemplary embodiment the authentication data requirement 72 is a requirement for biometric authentication data. Consequently, the authentication data requirement 72 is referred to herein as a biometric authentication data requirement. It should be appreciated that in other embodiments the authentication data requirement 72 may be a requirement for any other type of authentication data including, but not limited to, Global Positioning System (GPS) coordinates, unique pass-phrases, a combination of biometric data with GPS coordinates, a combination of biometric data with a unique pass-phrase, a combination of GPS coordinates with a unique pass-phrase, and a combination of biometric data with GPS coordinates and a unique pass-phrase.

The authentication policy 70 is generated by associating a biometric authentication data requirement 72 with each type of network-based transaction commensurate with the identified level of risk 64. Thus, each level of risk 64 that is associated with a network-based transaction 62 requiring access to protected resources in the first exemplary policy 60, and with an electronic payment transaction risk factor 68 in the second configurable policy 66, is also associated with an appropriate one of the biometric authentication data requirements 72 in the authentication policy 70. It should be appreciated that the biometric authentication data requirements 72 indicate at least one biometric type that is to be captured from a user to validate the identity of the user as an authorized user. The biometric types that are to be captured and used for identity validation are determined by the level of risk 64. It should be appreciated that the higher the level of risk 64 the more demanding the biometric authentication data requirement 72.

In order to facilitate enhancing increased trust in the validation results, as the level of risk 64 associated with a transaction 62 increases the number of different biometric types required for validation also increases. For example, a transaction 62 having a low level of risk 64 requires biometric data of a single biometric type such as voice biometric data. A transaction 62 having a high level of risk 64 requires biometric data of a plurality of different biometric types such as face and iris biometric data. It should be appreciated that the biometric authentication data requirement 72 for a level of risk 64 may be a combination of the biometric authentication data requirements 72 appropriate for lesser levels of risk 64. For example, the biometric authentication data requirement 72 for the highest level of risk 64 may be a combination of the biometric authentication data requirements 72 of the high and low levels of risk 64.

It should be understood that the authentication policy 70 may be reconfigured by defining the biometric authentication data requirements 72 and the levels of risk 64 in any desirable manner that facilitates validating the identity of a user as an authorized user. Moreover, the policy 70 may be reconfigured by changing the definitions of the biometric authentication data requirements 72 and the levels of risk 64. For example, the biometric authentication data requirement 72 for a high level risk 64 may be reconfigured such that the appropriate biometric authentication data requirement 72 stipulates authenticating the user with face, iris and fingerprint biometric data, instead of face and iris biometric data. Although the exemplary embodiment includes one authentication policy 70 stored in the BAC system 18, it should be appreciated that in other embodiments any number of authentication policies 70 may be generated and stored in the BAC system 18. It should be understood that changes in levels of risk 64 are to be coordinated between the first configurable policy 60, the second configurable policy 66 and the authentication policy 70.

FIG. 7 is a diagram 74 illustrating exemplary risk factors 76 and associated level of risk adjustments 78 that are for adjusting the levels of risk 64 associated with transactions 62 that require access to protected resources. It should be understood that the levels of risk 64 associated with the transactions 62 requiring access to protected resources are not static measurements, but instead are dynamic measurements that may be influenced by a variety of risk factors 76. Such risk factors 76 are defined by the BAC system 18 and may include, but are not limited to, the time of day biometric authentication data is collected by the communications device 20, the distance device 20 is from the home address when a transaction is initiated, and the length of time that has passed since a transaction was previously conducted. Another such risk factor 76 may be the number of times a user has attempted to conduct a transaction within a predetermined time period. That is, whether a user has attempted to conduct a transaction more than a maximum or more than an minimum number of times within a predetermined period of time.

It should be understood that the policy 74 is generated such that each level of risk adjustment 78 is associated with an appropriate one of the risk factors 74 and such that when one of the risk factors 74 is encountered, the level of risk 64 associated with the transaction 62 is adjusted according to the level of risk adjustment 78, prior to determining the biometric authentication data requirement 72. For example, when a user attempts to conduct a transaction accessing the active accounts data after normal business hours, the level of risk adjustment 78 requires increasing the level of risk 64 by one level of risk, that is, from lowest to low. As another example, when a user is located less than or equal to a distance of ten miles from a home address and attempts to conduct a transaction accessing the account balances data 62, the level of risk adjustment 78 requires decreasing the level of risk 64 by one level of risk, that is, from low to lowest. However, if a user is located greater than a distance of ten miles from the home address and attempts to conduct the transaction accessing the account balances data 62, the level of risk adjustment 78 requires increasing the level of risk 64 by one level of risk, that is, from low to high. As yet another example, when a predetermined period of time has elapsed since a user previously attempted to conduct a transaction accessing the protected resources stored in the SPC system 16, the level of risk adjustment 78 requires increasing the level of risk 64 by one level of risk. Such predetermined periods of time include, but are not limited to, one day, one week, two weeks, one month and three months. Moreover, it should be appreciated that the predetermined periods of time may be determined by the nature of the business entity. Although the level of risk adjustments 78 described herein involve increasing or decreasing an appropriate level of risk 64 by a single level of risk, it should be appreciated that in other embodiments the level of risk adjustments 78 may be greater than a single level of risk 64.

Users generally access network provided resources remotely and navigate web pages of web sites to conduct transactions 62 therein that require accessing protected resources associated with customer accounts. Such transactions include, but are not limited to, accessing account balances and withdrawing and transferring at least part of the protected resources. For example, customers may desire to remotely check financial account balances or transfer funds electronically to pay everyday bills such as the electric bill. It should be appreciated that due to security concerns associated with passwords used to access web pages over networks such as the Internet, merely entering a username and a password when remotely accessing a web page may not adequately guard protected resources against fraudulent access.

Figure 8:
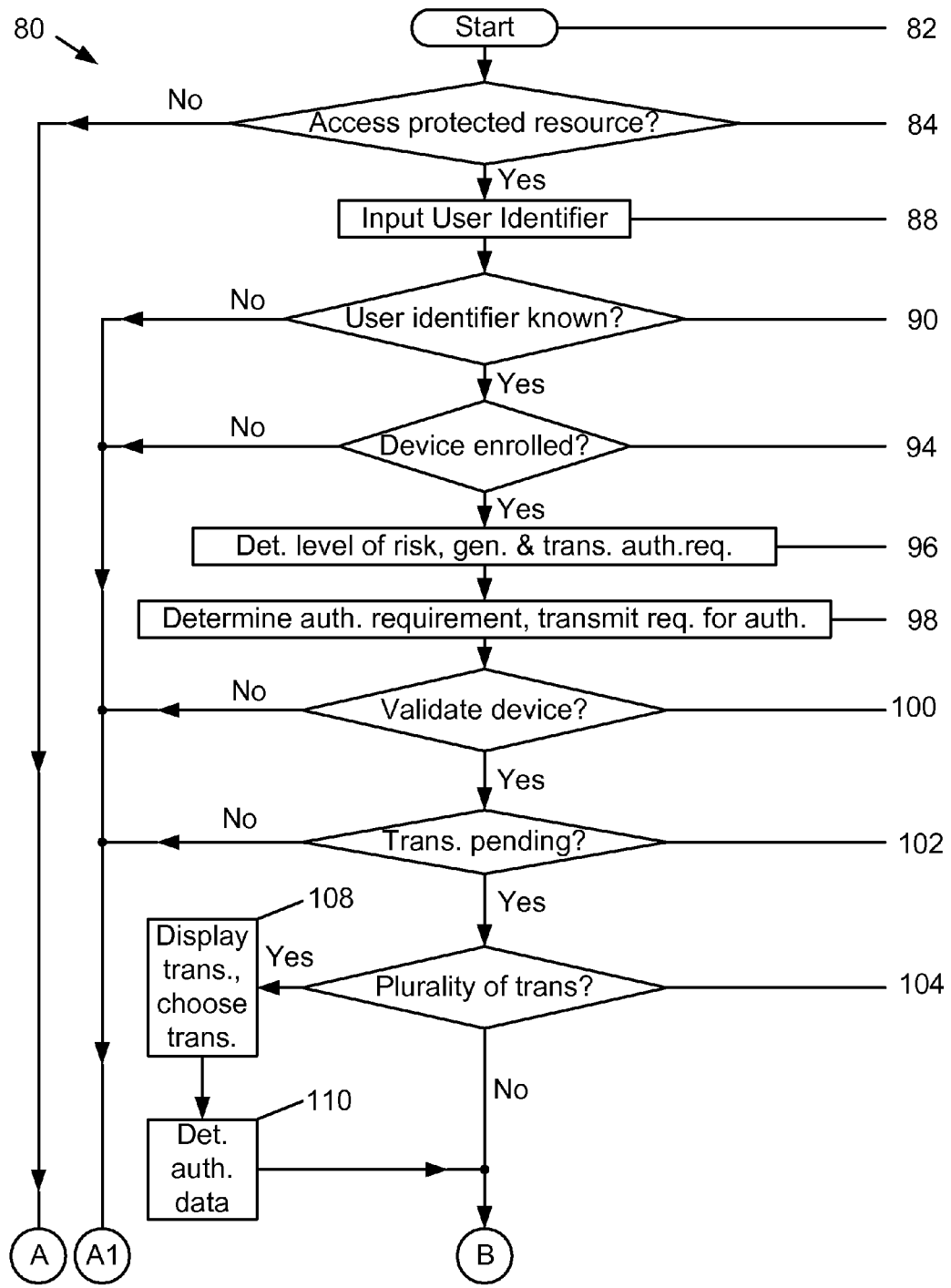
FIG. 8 is a flowchart illustrating an exemplary authentication process for reducing risks that network-based transactions may be conducted fraudulently.
Figure 8A:
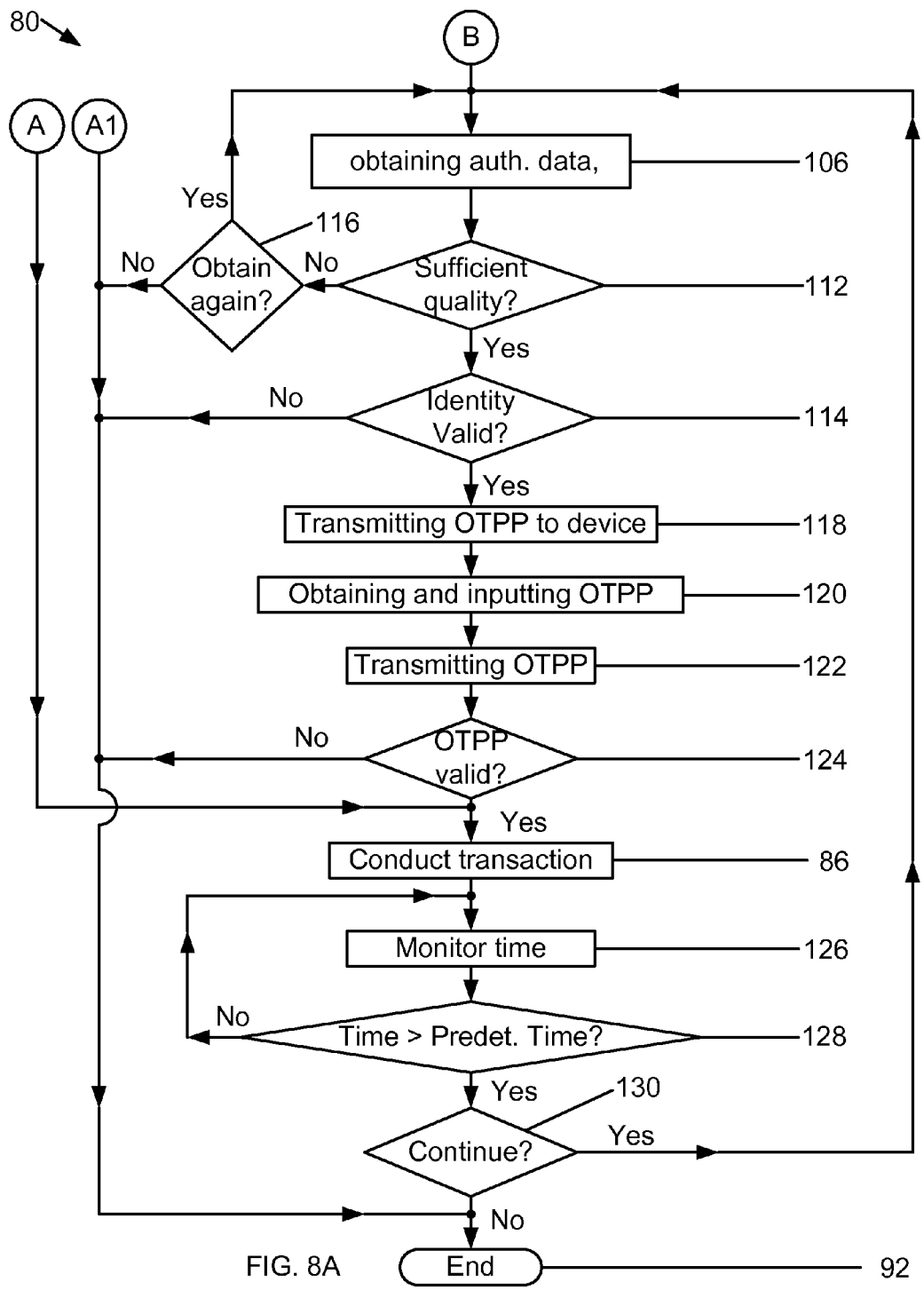
FIG. 8A is a continuation of the flowchart illustrated in FIG. 8.

FIG. 8 is a flowchart 80 illustrating an exemplary authentication process used by the AC system 10 for reducing risks that network-based transactions may be conducted fraudulently, and FIG. 8A is a continuation of the flowchart 80 of FIG. 8. For AC system 10 the process starts 82 when a user at the workstation 14 navigates over a network to a web site of a financial institution service provider and attempts to conduct a transaction at the web site that may require access to protected resources. Alternatively, the user may activate a thick client application stored in the workstation 14.

It should be appreciated that the financial institution service provider web site includes resources that are accessible to the general public and protected resources that are not accessible to the general public. Thus, users may conduct transactions 62 involving resources available to the public and conduct transactions 62 involving protected resources. By virtue of navigating the web page to indicate a desire to conduct a transaction 62 that may require access to protected resources, the workstation user requests access to resources that may be required for the transaction 62.

In order to determine whether or not a transaction requires access to protected resources 84, the SPC system 16 determines the level of risk 64 associated with the desired transaction 62. Specifically, the SPC system 16 compares the desired transaction 64 against the plurality of transactions 62 included in the policy 60 stored therein. When the level of risk 64 associated with the desired transaction 62 is the lowest level of risk 64, access to protected resources is not required 84 and the desired transaction 62 is automatically conducted 86. For example, when the user desires to conduct a transaction 62 merely determining regional office locations of the financial institution service provider, which transaction 62 has a lowest level of risk and thus does not require access to protected resources 84, the SPC system 16 automatically conducts 86 the desired transaction 62 by presenting the regional office locations on the display of workstation 14. However, when the SPC system 16 determines that the desired transaction 62 is associated with a level of risk 64 greater than the lowest level of risk 64, the desired transaction 62 requires access to protected resources and authentication is required to conduct the transaction.

Processing continues by prompting the user to input his unique user identifier 88 at the workstation 14. In the exemplary embodiment, the workstation user inputs 88 the unique user identifier into a text box included in the display of the workstation 14. However, it should be appreciated that in other embodiments, any method may be used to input 88 the unique user identifier that facilitates authenticating identities as described herein. Such methods include, but are not limited to, reading the unique user identifier from a smart card.

After inputting the unique user identifier 88, the SPC system 16 determines whether or not the unique user identifier is known 90 by comparing the inputted unique user identifier against the user identifiers stored therein. When the inputted unique user identifier does not match a user identifier stored in the SPC system 16, the unique user identifier is not known and processing ends 92.

However, when the inputted unique user identifier matches a user identifier stored in the SPC system 16, the inputted unique user identifier is determined to be known 90. Next, the SPC system 16 transmits the inputted unique user identifier to the BAC system 18. After receiving the inputted unique user identifier, the BAC system 18 determines whether the communications device 20 is enrolled 96 therein. Specifically, the BAC system 18 compares the inputted unique user identifier against user identifiers stored therein. Upon determining a match between the inputted unique user identifier and one of the user identifiers stored therein, the BAC system 18 determines the communications device identifier associated with the one matching user identifier and consults the state of the associated communications device identifier. When the state of the associated communications device identifier is enrolled 94, processing continues by determining the level of risk 64 associated with the desired transaction 62, and generating and transmitting an authentication request 96. Otherwise, when the state of the associated communications device identifier is not enrolled 94, processing ends 92.

After the BAC system 18 determines that the state of the associated communications device is enrolled 94, the BAC system 18 notifies the SPC system 16 that the communications device 20 associated with the inputted unique user identifier is enrolled. In response, the SPC system 16 compares the desired transaction 62 against the plurality of transactions 62 included in the policy 60 stored therein, to determine 96 the level of risk 64 associated with the desired transaction 62.

After determining 96 the level of risk 64 associated with the desired transaction 62, the SPC system 16 generates an authentication request 96 and transmits the authentication request 96 to the BAC system 18 over the first communications channel. It should be understood that the authentication request contains at least an identification number of the SPC system 16, a transaction identifier, the level of risk 64 associated with the desired transaction 62 and a customer identification number. It should be understood that each transaction identifier is an alphanumeric character string that may be any desired combination of letters and numbers.

Next, upon receiving the authentication request, the BAC system 18 extracts the level of risk 64 from the authentication request and consults the authentication policy 70 to determine 98 the biometric authentication data requirement 72 that corresponds to the extracted level of risk 64. The BAC system 18 compares the extracted level of risk against the levels of risk 64 to determine 98 and identify the corresponding biometric authentication data requirement 72. Specifically, the biometric authentication data requirement 72 is determined 98 to be the biometric authentication data requirement 72 that corresponds to the level of risk 64 that matches the extracted level of risk.

After determining 98 the biometric authentication data requirement 72, the BAC system 18 automatically transmits a message to the communications device 20 to wake-up the device 20 and invoke the security application stored therein. After transmitting the wake-up message, the BAC system 18 generates and transmits an authentication data capture request to the communications device 20 over the second communications channel 24. In the exemplary embodiment, the authentication data capture request includes at least the biometric authentication data requirement 72. Consequently, the authentication data capture request is referred to herein as a biometric authentication data capture request. However, it should be appreciated that in other embodiments the authentication capture request may include an authentication data requirement 72 corresponding to any other type of authentication data.

Upon receiving the biometric authentication data capture request transmission, the communications device 20 verifies that the biometric authentication data capture request was transmitted from the BAC system 18. When it is determined that the biometric authentication data capture request was transmitted from the BAC system 18, the security application stored in the device 20 causes the device 20 to display the biometric authentication data capture request. However, when the biometric authentication data capture request cannot be verified as being transmitted from the BAC system 18, processing ends.

Although the BAC system 18 transmits the biometric authentication data capture request to the communications device 20 in the exemplary embodiment, it should be appreciated that in other embodiments, the BAC system 18 may transmit the biometric authentication data capture request to the workstation 14 over the first communications channel. In such other embodiments, upon receiving the biometric authentication data capture request, the workstation 14 displays a message prompting the user to obtain the communications device 20. The user obtains the communications device 20 and invokes the security application stored therein by activating an icon or button of the communications device 20. It should be appreciated that in yet other embodiments, the user may obtain the device 20 at any time during the authentication process such that the security application may be invoked as described herein. Thus, in other embodiments, the user is not required to obtain the device 20 in response to any kind of prompt.

After the security application is invoked, the communications device identifier of the communications device 20 is obtained. Next, the security application causes the communications device 20 to initiate communications with the BAC system 18 and transmit the communications device identifier to the BAC system 18. After receiving the communications device identifier, the BAC system 18 validates 100 the communications device 20 by determining whether the communications device 20 is known. Specifically, the BAC system 18 compares the received communications device identifier against the communications device identifiers stored therein, and determines that the communications device 20 is known when the received communications device identifier matches one of the communications device identifiers stored therein. Otherwise, when the received communication device identifier does not match one of the communications device identifiers stored in the BAC system 18, the communications device 20 is not validated 100, and processing ends 92.

After validating 100 the communications device 20, the BAC 18 continues processing by determining whether or not a transaction is pending 102 for the communications device 20. If a transaction is not pending 102, processing ends 92. However, if a transaction is pending 104, processing continues such that the BAC system 18 determines whether or not a plurality of transactions is pending 104. It should be appreciated that transactions 62 are considered to be pending when the user indicates a desire to conduct a transaction 62, but does not biometrically authenticate as required to complete the transaction 62.

It should be appreciated that in the exemplary embodiment, a plurality of transactions 62 requiring biometric authentication may be pending simultaneously. For example, after navigating to the website of the financial institution service provider and indicating a desire to conduct a transaction 62 for withdrawing funds, the user may decide not to authenticate as required to complete the transaction 62. Instead, the user may decide to open another window and navigate to the web site of a hospital and indicate a desire to conduct a transaction 62 for reviewing his health records, and decide not to biometrically authenticate as required to complete the hospital transaction. By virtue of not authenticating as required to withdraw funds, and not authenticating to review the health records, each of these transactions is considered to be a pending transaction. Thus, a plurality of transactions 62 may be pending simultaneously in the exemplary embodiment. It should be appreciated that each of the plurality of transactions remains pending for a finite period of time. That is, in the exemplary embodiment, each of the pending transactions expires two minutes after the user indicates a desire to conduct the transaction 62. However, it should be appreciated that in other embodiments each of the pending transactions may expire after any length of time that facilitates validating identities as described herein.

If a plurality of transactions is not pending 104, processing continues by obtaining the biometric authentication data capture request and obtaining 106 biometric authentication data in accordance with the biometric authentication data capture request. However, when a plurality of transactions is pending 104 processing continues by displaying 108 the pending transactions 62 in the display of the communications device 20. The user chooses one of the displayed transactions 108 to conduct, the SPC system 16 determines the level of risk 64 associated with the chosen transaction 108, and the BAC system 18 determines 110 the biometric authentication data requirement 72 associated with the chosen transaction 108. Processing then continues by obtaining 106 the biometric authentication data determined at operation 110. Although the exemplary embodiment uses the authentication policy 70 to determine the biometric authentication data requirement 72, it should be appreciated that in other embodiments an authentication policy may not be available. In such other embodiments, all available data may be collected regardless of the transaction type, the data obtained may be determined by the user, the user may be repeatedly prompted for authentication data until sufficient authentication data is obtained, or the BAC system 18 may determine not to proceed. Moreover, it should be appreciated that in other embodiments the BAC system 18 may determine the level of risk 64 associated with the chosen transaction.

It is assumed that the authorized user associated with the inputted unique user identifier is in possession of the device 20 in the exemplary embodiment, and can be contacted using the communications device 20. Thus, by virtue of validating the device 100 and transmitting the biometric authentication data capture request to the communications device 20, the biometric authentication data capture request is considered to be transmitted to the authorized user associated with the inputted unique user identifier. It should be understood that the authentication data is to be obtained by and transmitted from a single communications device that is out-of-band with the workstation 14. That is, any communications device separate and distinct from the workstation 14, and that communicates on a different channel than the workstation 14. Communications device 20 is such an out-of-band communications device. Thus, after reading, or obtaining, the biometric authentication data capture request transmission from the communications device display, the user obtains biometric authentication data 106 in accordance with the biometric authentication data capture request transmission with the communications device 20.

Next, in the exemplary embodiment, processing continues by transmitting the obtained biometric data from the communications device 20 to the BAC system 18 over the second communications channel, and evaluating the obtained biometric data with the BAC system 18 to verify that the obtained biometric data is of sufficient quality 112 usable in determining a sufficiently similar comparison match and related numerical score. When biometric data of sufficient quality is obtained 112, processing continues by authenticating the identity 114 of the workstation user as the authorized user. However, when the quality of the obtained biometric data is insufficient 112, processing continues by again obtaining 116 all of the requested biometric authentication data. It should be appreciated that part of the obtained biometric data may be of sufficient quality while other parts of the obtained biometric data may be of insufficient quality. Thus, in other embodiments only obtained biometric data of insufficient quality may be obtained again 116. Moreover, in other embodiments instead of obtaining the same biometric data again 116, additional different biometric authentication data may be obtained in order to achieve a required biometric data confidence level.

In the exemplary embodiment, biometric authentication data corresponding to the requested biometric authentication data may be obtained 116 six times. When acceptable biometric authentication data is not obtained after six attempts, processing ends 92. However, it should be appreciated that in other embodiments biometric data may be obtained any number of times 116.

Although processing ends 92 in the exemplary embodiment when acceptable biometric authentication data is not provided after six attempts, it should be appreciated that in other embodiments after six attempts, instead of obtaining 116 the same biometric data again, different biometric authentication data may be requested for authentication, obtained 106, and evaluated for sufficient quality 112. Moreover, it should be appreciated that in other embodiments any number of different alternative biometric types, as well as any combination of different alternative biometric types, may be obtained 106 as biometric authentication data. After a user has repeatedly obtained biometric data 106, 112, 116 of insufficient quality, the user may contact the financial institution service provider and notify the financial institution service provider that a problem may exist in the authentication system.

Next, processing continues by validating the identity of the user 114 by comparing the obtained biometric data 114 against the enrollment data record of an authorized user that is associated with the one matching communications device identifier in the BAC system 18. The comparison 114 is such that a numerical score, based on the similarity of the comparison match, is determined for at least one biometric comparison match. It should be appreciated that a numerical score based on the similarity of a comparison match, may be determined for each of a plurality of different biometric comparison matches. Thus, a plurality of numerical scores may also be determined. The numerical scores for each comparison match are combined using any desirable mathematical computation to yield a confidence score, and the user is identified as the authorized user associated with the inputted unique user identifier when the confidence score is at least equal to a predetermined threshold value. It should be appreciated that the confidence scores are based on how well obtained biometric data match against the corresponding biometric data stored in the BAC system 18.

By virtue of being at least equal to the predetermined threshold value, the confidence scores reflect an adequate level of trust in the authentication result. Moreover, it should be appreciated that as the margin by which the confidence score exceeds the predetermined threshold increases, the trust in the authentication result also increases. The predetermined threshold value may be changed depending on factors such as, but not limited to, the time of year. For example, during the holiday shopping season the likelihood of fraud may be greater than during other times of the year. Consequently, the predetermined threshold value may be increased during the holiday shopping season. However, it should be appreciated that the predetermined threshold value may be changed on any basis that facilitates validating the identity of a user 114 as described herein.

When the identity of the workstation user is validated 114 as the authorized user associated with the inputted unique user identifier, the BAC system 18 generates, stores and transmits an OTPP 118 to the communications device 20 over the second communications channel, and the communications device 20 automatically displays the transmitted OTPP. Otherwise, when the identity of the user at workstation 14 is not validated 114 as being the authorized user associated with the inputted unique user identifier, processing ends 92.

After transmitting the OTPP 118 to the communications device 20, the communications device 20 displays the OTPP transmission such that the user is able to obtain 120 the received OTPP by reading the communications device 20 display, and manually enter 120 the OTPP into a pass-phrase text input box at the workstation 14. Next, the workstation 14 transmits 122 the OTPP to the SPC system 16, and the SPC system 16 in turn transmits 122 the OTPP to the BAC system 18 for validation 124. It should be appreciated that in the exemplary embodiment the OTPP is associated with the user unique identifier and the communications device identifier in the BAC system 18 in order to prevent sharing of OTPPs between users conducting simultaneous transactions.

The BAC system 18 validates 124 the OTPP by comparing the OTPP received from the SPC system 16 against the OTPP stored in the BAC system 18 and transmitted to the communications device 20 by the BAC system 18. Moreover, the BAC system 18 verifies that the OTPP has not expired. When the OTPP received from the SPC system 16 matches the OTPP transmitted to the communications device 20, and the OTPP has not expired, the OTPP is validated 124 and the user is permitted to conduct 86 the desired transaction 62. It should be appreciated that upon successfully validating 124 the OTPP, a message indicating that the OTPP was validated is presented to the user at the workstation 14 and the OTPP is deleted from each element of the AC system 10. Otherwise, when the OTPP is not successfully validated 124, processing ends 92. Although the exemplary embodiment compares the OTPP received from the SPC system 16 against the OTPP transmitted to the communications device 20, it should be appreciated that in other embodiments the received OTPP may be compared against a specific transaction from the financial institution service provider. It should be appreciated that in addition to facilitating increased trust in authentication results, that providing the OTTP facilitates implementing the authentication process described herein on legacy type computer systems.

After granting the user access to the protected resources to conduct 86 the desired transaction 62, the SPC system 16 monitors the time 126 which has elapsed since access was granted 86. When a predetermined time period has elapsed 128, such as fifteen minutes, access to the protected resources is denied. It should be appreciated that after access is granted 86, the SPC system 16 also monitors the time 126 during which no transactions are performed on the webpage. Access to the protected resources is also denied after a predetermined period of inactivity, such as five minutes. After access is denied 128, the user may indicate whether or not he would like to continue 130 accessing the protected resources. When the user desires to continue 130 accessing the protected resources, processing continues by obtaining the requested biometric authentication data 106. Otherwise, when the user does not desire to continue accessing 130 the protected resources, processing ends 92. Thus, in the exemplary embodiment the process illustrated by the flowchart 80 enables network-based transactions that may require access to protected resources to be conducted with greater security and thereby facilitates reducing risks that network-based transactions may be conducted fraudulently.

Figure 9:
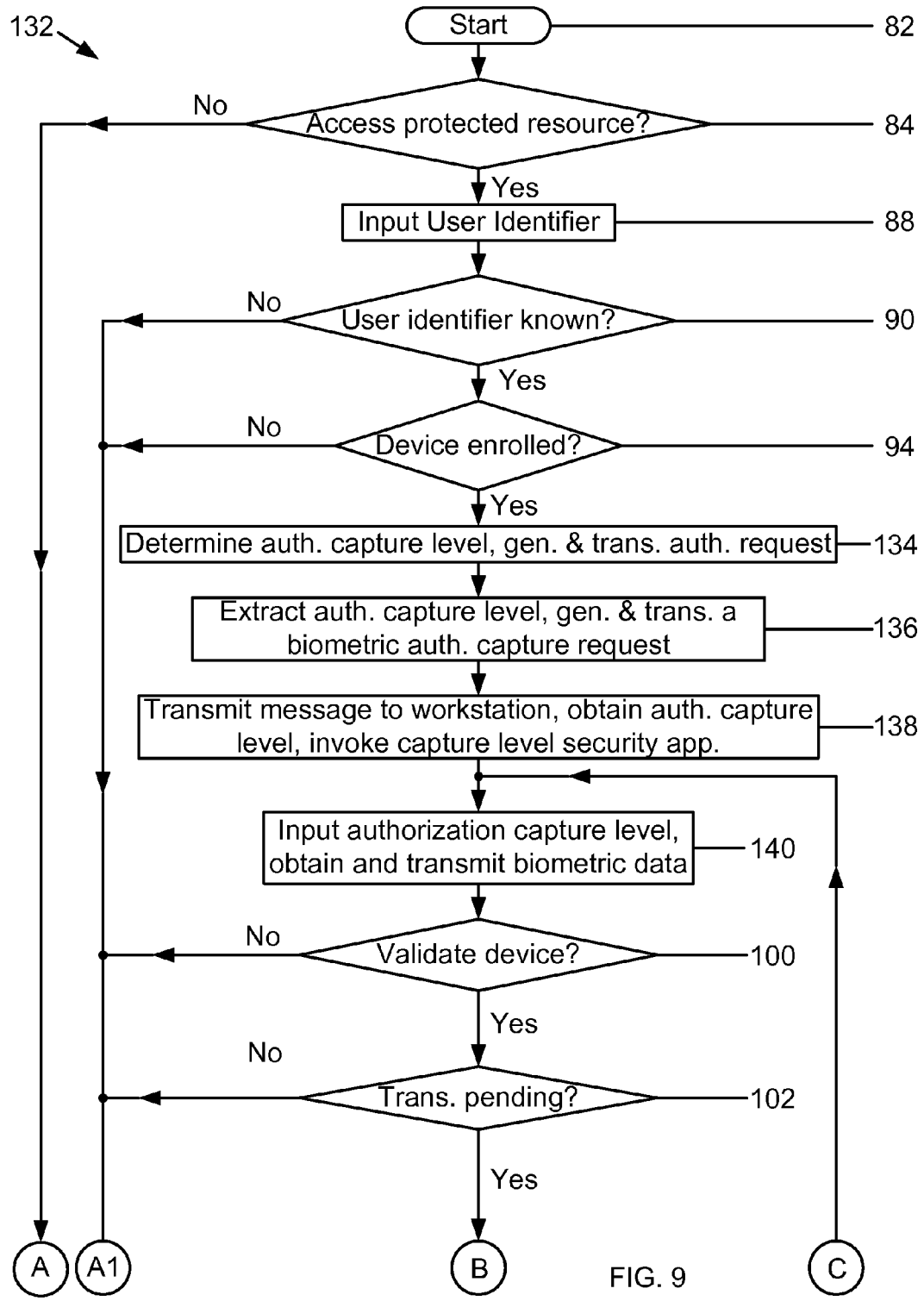
FIG. 9 is a flowchart illustrating an alternative exemplary authentication process for reducing risks that network-based transactions may be conducted fraudulently.
Figure 9A:
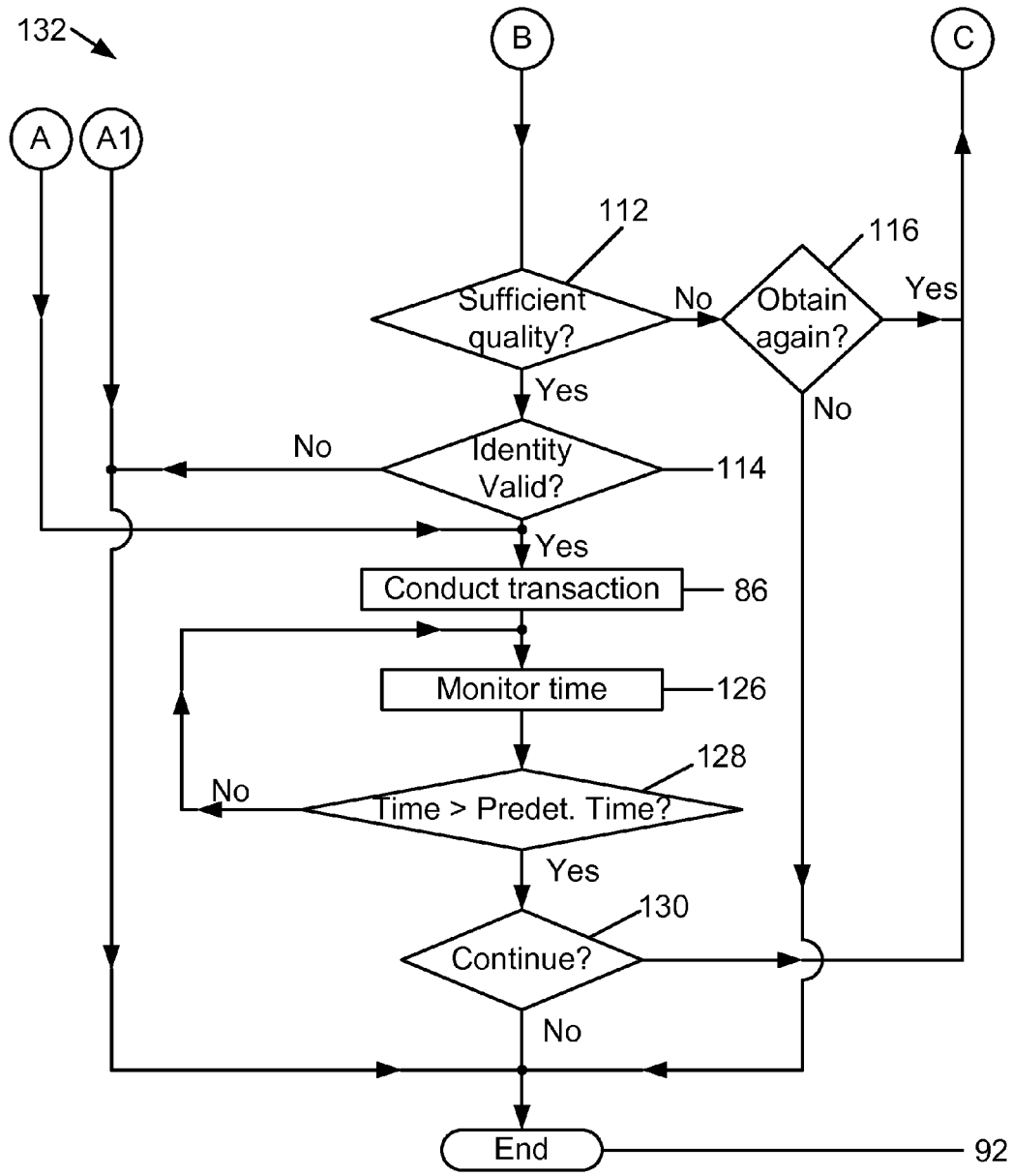
FIG. 9A is a continuation of the flowchart illustrated in FIG. 9.

The information shown in FIGS. 9 and 9A is substantially the same information shown in FIGS. 8 and 8A, respectively, as described in more detail below. As such, operations illustrated in FIGS. 9 and 9A that are identical to operations illustrated in FIGS. 8 and 8A, are identified using the same reference numerals used in FIGS. 8 and 8A.

FIG. 9 is a flowchart 132 illustrating an alternative exemplary authentication process used by the AC system 10 for reducing risks that network-based transactions that may require access to protected resources may be conducted fraudulently, and FIG. 9A is a continuation of the flowchart 132 of FIG. 9. This alternative embodiment is similar to that shown in FIGS. 8 and 8A, respectively. However, the biometric authentication data requirement 72 is determined by a capture level security application stored in the communications device 20. More specifically, after determining 94 that the communications device 20 associated with the inputted unique identifier is enrolled 94, the SPC system 16 determines 134 the level of risk 64 of the desired transaction 62, and generates and transmits an authentication request to the BAC system 18. In response to the authentication request, the BAC system 18 determines an authentication capture level 136 corresponding to a biometric authentication data requirement 72 of the desired transaction 62. Moreover, the BAC system 18 generates and transmits a biometric authentication data capture request 136 including at least the authentication capture level to the SPC system 16. Furthermore, it should be appreciated that the biometric authentication data capture request specifies that the capture level security application is to be used for determining the biometric authentication data requirement 72 for the desired transaction 62 through use, in part, of the authentication capture level 136 specified in a capture level message transmitted by the SPC system 16.

In this alternative embodiment each level of risk 64 is associated with an authentication capture level. Specifically, the lowest, low, high and highest levels of risk 64 are associated with authentication capture levels 1, 2, 3 and 4, respectively. For example, a transaction 62 to withdraw funds is associated with an authentication capture level of 3 because withdrawing funds 62 has a high level of risk 64. Thus, by virtue of being associated with a particular level of risk 64, each of the authentication capture levels is also associated with the biometric authentication data requirement 72 corresponding to the particular level of risk 64. Although this alternative embodiment designates the authentication capture levels with numbers, it should be appreciated that in other embodiments any method may be used to designate the authentication capture levels that facilitates authenticating identities as described herein. Such methods include, but are not limited to, designating the capture levels with letters or colors, or simply using the lowest, low, high, or highest level of risk 64 designations.

In this alternative embodiment, upon receiving the biometric authentication data capture request, the SPC system 16 transmits a capture level message to the workstation 138 that includes the capture level of the desired transaction 62 and specifies that the capture level security application included in the device 20 is to be used for determining the biometric authentication data requirement 72 for the transaction 62. Upon receiving the authentication capture level transmission, the workstation 14 displays a message including the authentication capture level prompting the user to enter the displayed authentication capture level into the communications device 20. Next, the user obtains the authentication capture level 138 from the workstation 14 and invokes the capture level security application 138 stored in the communications device 20 by activating an appropriate icon or button of the communications device 20.

Upon invoking the capture level security application 138, a message appears on the display of the communications device 20 that prompts the user to input the authentication capture level 140 into the communications device 20. After inputting the authentication capture level 140, the communications device 20 displays the corresponding biometric authentication data requirement 72. For example, after obtaining the authentication capture level of 3 from the workstation 14, the user inputs the capture level of 3 into the device 20. In response to inputting the capture level of 3, the capture level security application causes the communications device 20 to display the biometric authentication data 72 to be obtained. Specifically, the communications device 20 displays a message indicating that the user is to obtain face and iris biometric data. The user then obtains 140 the biometric data in accordance with the biometric authentication data requirement 72 using the communications device 20, and transmits 140 the obtained biometric data from the communications device 20 to the BAC system 18.

After conducting operation 100, and determining that a transaction is pending 102, processing continues with the BAC system 18 verifying that biometric data of sufficient quality 112 was obtained that may be used to determine a sufficiently similar comparison match and related numerical score. When biometric data of sufficient quality is obtained 112, processing continues by validating the identity 114 of the user as the authorized user. However, in this alternative embodiment, when the quality of the obtained biometric data is not sufficient 112, processing continues by obtaining 116 all of the requested biometric authentication data. However, it should be appreciated that in other embodiments a portion of the obtained 140 biometric data may be of sufficient quality such that all of the requested biometric authentication data need not be obtained again 116. Thus, in other embodiments, insufficient quality biometric authentication data may be obtained again 116 or additional biometric authentication data may be obtained in order to achieve a required biometric data confidence level.

In the exemplary embodiment, biometric authentication data corresponding to the requested biometric authentication data may be obtained 116 six times. When acceptable biometric authentication data is not captured after six attempts, processing ends 92. However, it should be appreciated that in other embodiments biometric data may be obtained any number of times 116.

Although processing ends 92 in the exemplary embodiment when acceptable biometric authentication data is not provided after six attempts, it should be appreciated that in other embodiments after six attempts, instead of obtaining 116 the same biometric data again, different biometric authentication data may be requested and obtained 140, and evaluated for sufficient quality 112. Moreover, it should be appreciated that in other embodiments any number of different alternative biometric types, as well as any combination of different alternative biometric types, may be obtained 140 as biometric authentication data. After a user has repeatedly obtained biometric data 140, 112, 116 of insufficient quality, the user may contact the financial institution service provider and notify the financial institution service provider that a problem may exist in the authentication system.

Next, processing continues by validating the identity of the user 114. When the identity of the workstation user is validated 114 as the authorized user associated with the inputted unique user identifier, the BAC system 18 notifies the SPC system 16 that the user has been validated as the authorized user and the SPC system 16 grants the user access to the protected resources required to conduct 86 the desired transaction 62. Processing continues by performing operations 126, 128 and 130. Next, processing ends 92. Thus, in this alternative embodiment the process illustrated by the flowchart 132 also enables network-based transactions that may require access to protected resources to be conducted with greater security, and thereby facilitates reducing risks that network-based transactions that may require access to protected resources may be conducted fraudulently.

Although the process described in the alternative embodiment of FIGS. 9 and 9A does not include an OTPP, it should be appreciated that in other embodiments an OTPP may be included. In such other embodiments the communications device 20 should also be authenticated by the BAC system 18 when the communications device 20 is validated. It should be appreciated that the user may make a typographical error when manually entering the OTPP. Thus, it should be appreciated that in other embodiments the OTPP may be entered using any method such as, but not limited to, automatically transmitting the OTPP to the workstation 14. Specifically, the OTPP may be automatically transmitted as a result of the user pressing an icon or button on the device 20 in response to a prompt to automatically transmit the OTPP, or the OTPP may be automatically transmitted to the workstation 14 without pressing an icon or button. It should be understood that upon receiving the OTPP, the communications device 20 may prompt the user to select between manually entering the OTPP in the workstation 14 or automatically transmitting the OTPP to the workstation 14. The user may enter an input indicating which to choose by pressing an appropriate icon or button of the communications device 20.

It should be appreciated that in the embodiments described herein with regard to FIGS. 8 and 8A, and FIGS. 9 and 9A, in response to a communication from the first communications channel, subsequent communications are caused to occur over the second communications channel. Specifically, the BAC system 18 initiates an authentication process over the second communications channel with the device 20 in response to an authentication request received over the first communications channel. The BAC system 18 receives obtained biometric data from the device 20 and biometrically validates the identity of the workstation user. Thus, by virtue of a communication over the first channel, communications are caused to be transmitted and received over the second communications channel that enable facilitating authentication of the workstation user on the first communications channel. Moreover, it should be appreciated that communications over the first channel, occurring after biometric authentication over the second channel, are more secure due to the high level of trust inherent with biometric authentication results.

Users may remotely purchase goods over networks by navigating the web sites of merchants. Such goods include, but are not limited to, laptop computers, clothes, skis and toys. For example, customers may desire to remotely purchase toys during the holiday season from merchant web sites. However, due to security concerns associated with purchasing items over networks such as the internet, current network purchasing techniques may not adequately protect against fraudulent payment transactions conducted over networks.

Figure 10:
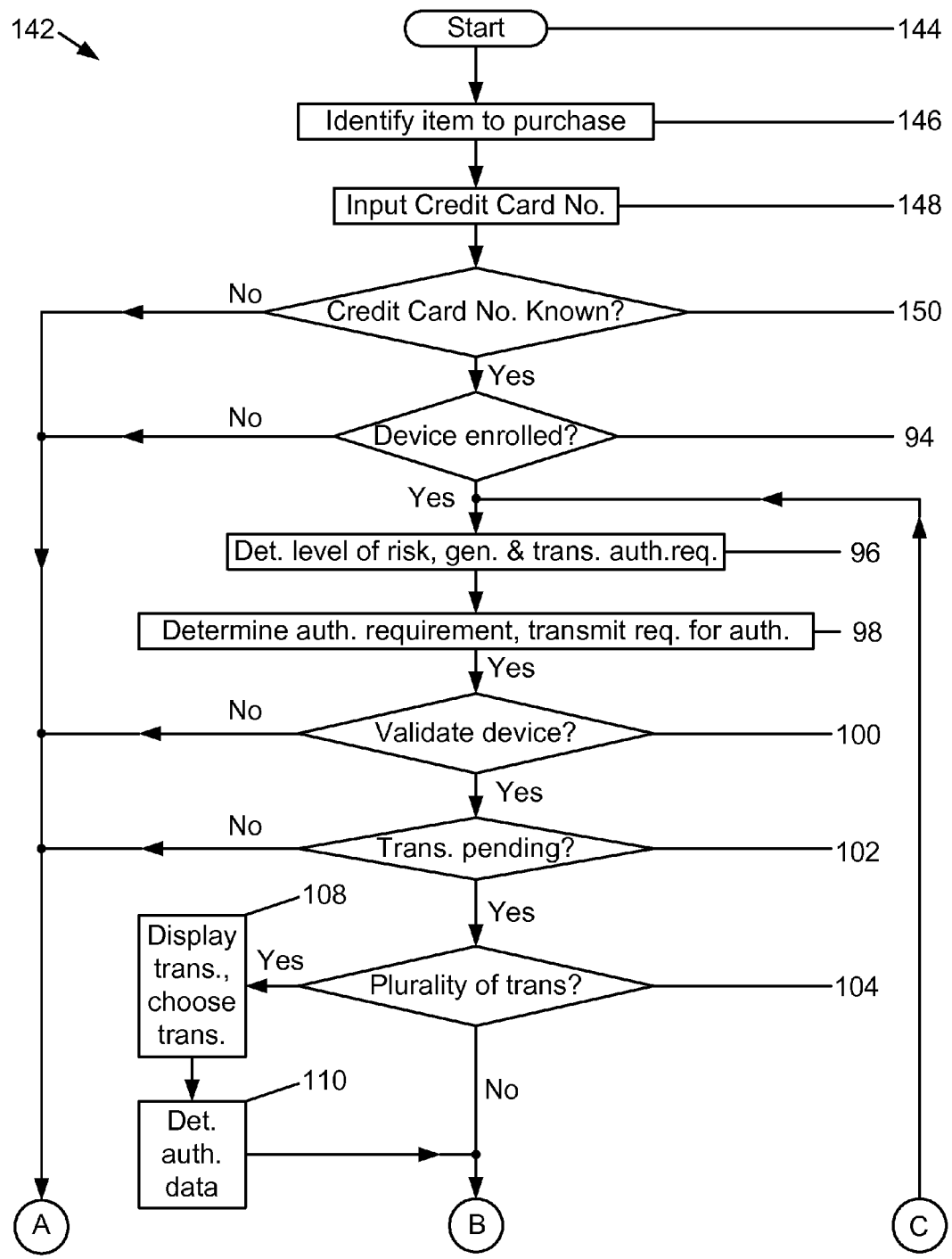
FIG. 10 is a flowchart illustrating another alternative exemplary authentication process for reducing risks that network-based transactions may be conducted fraudulently.
Figure 10A:
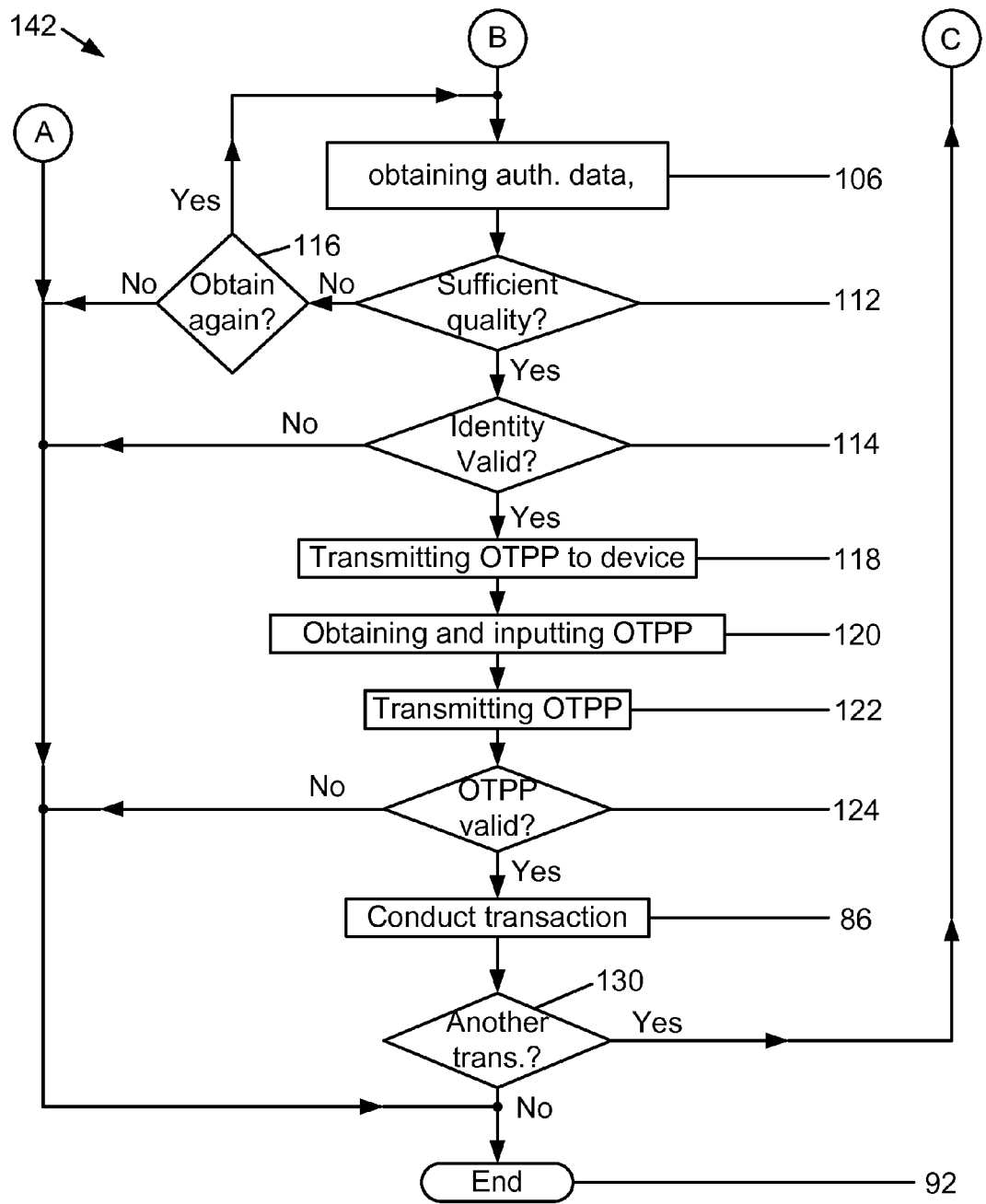
FIG. 10A is a continuation of the flowchart illustrated in FIG. 10.

The information shown in FIGS. 10 and 10A is substantially the same information shown in FIGS. 8 and 8A, respectively, as described in more detail below. As such, operations illustrated in FIGS. 10 and 10A that are identical to operations illustrated in FIGS. 8 and 8A, are identified using the same reference numerals used in FIGS. 8 and 8A.

FIG. 10 is a flowchart 142 illustrating an alternative exemplary authentication process used by the AC system 10 for reducing risks that network-based electronic payment transactions may be conducted fraudulently, and FIG. 10A is a continuation of the flowchart 142 of FIG. 10. This alternative embodiment is similar to that shown in FIGS. 8 and 8A, respectively. However, the network-based transaction of this alternative embodiment is an electronic payment transaction, not a transaction requiring access to protected resources, and the unique user identifiers stored in the SPC system 16 and in the BAC system 18 are credit card numbers.

For AC system 10, the process starts 144 when a user at the workstation 14 navigates over a network to a web site operated by the merchant system 12 and identifies at least one item to purchase 146 from the merchant. In response, the merchant system 12 prompts the user to select an electronic payment transaction method from a menu of electronic payment transaction methods to complete an electronic payment transaction, and the user selects an electronic payment method. In this alternative embodiment, the workstation user elects to conduct the electronic payment transaction with a credit card. However, it should be appreciated that in other embodiments any electronic form of payment may be used that facilitates reducing network-based electronic payment transaction risks as described herein.

After the user elects to conduct the electronic payment transaction with a credit card, the merchant system 12 prompts the user to input a unique user identifier 148 at the workstation 14. In this alternative embodiment, the unique user identifier is the credit card number of the credit card elected for conducting the electronic payment transaction. The workstation user inputs 148 the credit card number into a text box included in the display of the workstation 14. It should be appreciated that in other embodiments, any method may be used to input 148 the credit card number such as, but not limited to, reading the credit card number from a magnetic strip included on the credit card or from a smart card.

After inputting the credit card number 148, prior to accepting the credit card number and completing the electronic payment transaction, the merchant system 12 generates and transmits a credit card authentication request to the SPC system 16 over the first communications channel. The credit card authentication request includes at least the credit card number. In response to the credit card authentication request transmission, the SPC system 16 determines whether or not the credit card number is known 150 by comparing the inputted credit card number against credit card numbers stored therein. When the inputted credit card number does not match a credit card number stored therein, the credit card number is not known 150, the electronic payment transaction is not completed, and processing ends 92.

However, when the inputted credit card number matches a credit card number stored in the SPC system 16, the inputted credit card number is considered known 150. Next, the SPC system 16 transmits the inputted credit card number to the BAC system 18. In response, the BAC system 18 compares the inputted credit card number against credit card numbers stored therein. Upon determining a match between the inputted credit card number and one of the credit card numbers stored therein, the BAC system 18 determines the communications device identifier associated with the one matching credit card number and consults the state of the associated communications device identifier. When the state of the associated communications device identifier is enrolled 94, processing continues by determining 96 the level of risk 64 associated with the electronic payment transaction. Otherwise, when the state of the associated communications device identifier is not enrolled 94, processing ends 92.

After the BAC system 18 determines that the state of the associated communications device is enrolled 94, the BAC system 18 notifies the SPC system 16 that the communications device 20 associated with the inputted credit card number is enrolled. In response, the SPC system 16 determines 96 the level of risk 64 associated with the electronic payment transaction 62. Specifically, the SPC system 16 determines 96 the level of risk 64 corresponding to each associated risk factor 68 and determines the greatest level of risk of the associated risk factors as the level of risk 64 for the electronic payment transaction.

After determining 96 the level of risk 64 associated with the electronic payment transaction 62, the SPC system 16 generates an authentication request 96 and transmits the authentication request 96 to the BAC system 18 over the first communications channel. Next, processing continues by conducting operations 98, 100, 102 and 104.

It should be appreciated that in this alternative embodiment, a plurality of electronic payment transactions 62 requiring biometric authentication may be pending simultaneously. For example, after navigating to a sports equipment web site and indicating a desire to conduct an electronic payment transaction 62 for purchasing a football, the user may decide not to authenticate as required to complete the football electronic payment transaction 62. Instead, the user may decide to open another window and navigate to a medical equipment web site and indicate a desire to conduct an electronic payment transaction 62 for purchasing a laboratory coat, and decide not to biometrically authenticate as required to complete the laboratory coat electronic payment transaction. By virtue of not authenticating as required to complete the electronic payment transactions, each of these electronic payment transactions is considered to be a pending transaction. Thus, a plurality of electronic payment transactions 62 may be pending simultaneously in the this alternative embodiment. It should be appreciated that each of the plurality of electronic payment transactions remains pending for a finite period of time. That is, in this alternative embodiment, each of the pending electronic payment transactions expires two minutes after the user indicates a desire to conduct the electronic payment transaction 62. However, it should be appreciated that in other embodiments each of the pending electronic payment transactions may expire after any length of time that facilitates authenticating identities as described herein.

If a plurality of transactions is not pending 104, processing continues by obtaining the biometric authentication capture request and obtaining 106 biometric authentication data 72 in accordance with the biometric authentication data capture request. However, when a plurality of transactions is pending 104 processing continues by displaying 108 the pending transactions 62 in the display of the communications device 20. Processing then continues by conducting operations 106, 110, 114-124 and 86 as described herein with regard to the exemplary embodiment illustrated in FIGS. 8 and 8A.

After determining that the user is permitted to conduct 86 the desired electronic payment transaction 62, the SPC system 16 transmits an authentication confirmation message to the merchant system 12 over the first communications channel indicating that the workstation user has been successfully authenticated. The merchant system 12 then accepts the inputted credit card number and completes the electronic payment transaction. Should the workstation user decide to conduct another electronic payment transaction 130, processing continues by determining 96 the level of risk 64 of the electronic payment transaction 62. Otherwise, processing ends 92.

Figure 11:
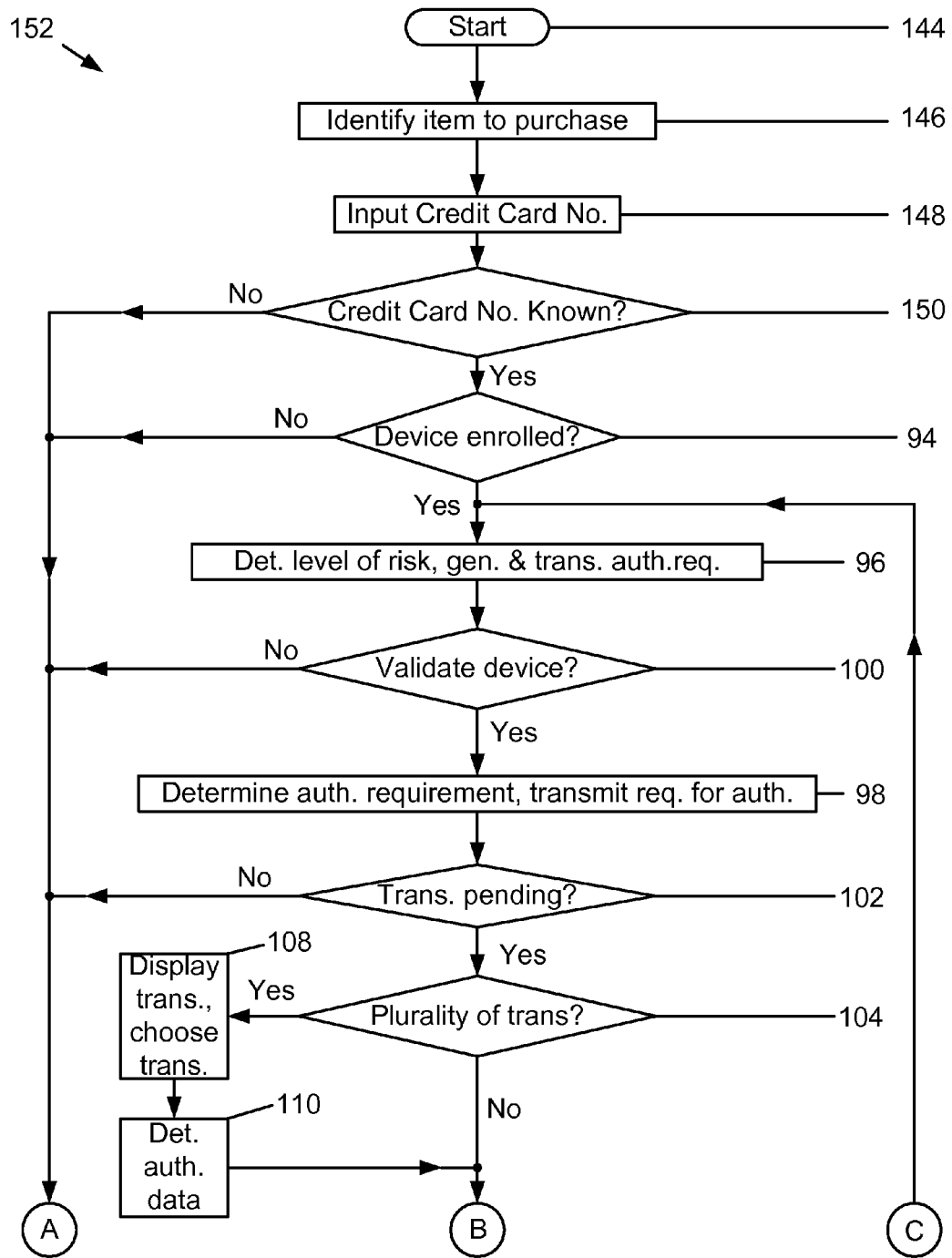
FIG. 11 is a flowchart illustrating yet another alternative exemplary authentication process for reducing risks that network-based transactions may be conducted fraudulently.
Figure 11A:
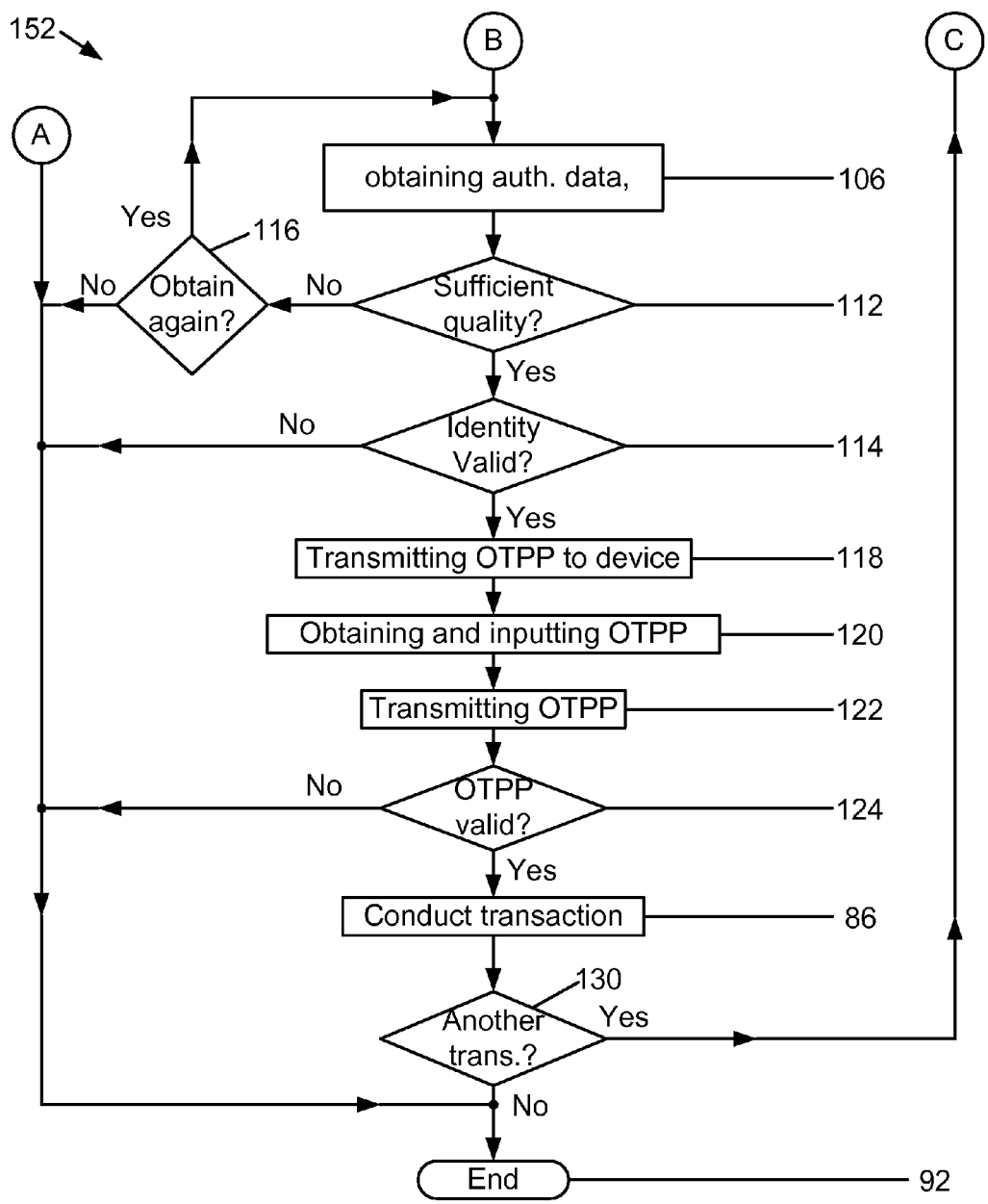
FIG. 11A is a continuation of the flowchart illustrated in FIG. 11.

The information shown in FIGS. 11 and 11A is substantially the same information shown in FIGS. 10 and 10A, respectively, as described in more detail below. As such, operations illustrated in FIGS. 11 and 11A that are identical to operations illustrated in FIGS. 10 and 10A, are identified using the same reference numerals used in FIGS. 10 and 10A.

FIG. 11 is a flowchart 152 illustrating another alternative exemplary authentication process used by the AC system 10 for reducing risks that network-based electronic payment transactions may be conducted fraudulently, and FIG. 11A is a continuation of the flowchart 152 of FIG. 11. This alternative embodiment is similar to that shown in FIGS. 10 and 10A, respectively. However, the workstation user initiates communications over the second communications channel with the communications device 20 to begin validation, instead of the BAC system 18 initiating communications over the second communications channel to begin validation.

For AC system 10, processing starts 144 by conducting operations 146, 148, 150 and 94. After determining that the state of the associated communications device identifier is enrolled 94, the BAC system 18 notifies the SPC system 16 that the communications device 20 associated with the inputted credit card number is enrolled. Processing continues by determining 96 the level of risk 64 associated with the electronic payment transaction 62. After determining 96 the level of risk 64 associated with the electronic payment transaction 62, the SPC system 16 generates an authentication request 96 and transmits the authentication request 96 to the workstation 14. It should be understood that the authentication request contains at least an identification number of the SPC system 16, a transaction identifier, the level of risk 64 associated with the electronic payment transaction 62 and a customer identification number. Upon receiving the authentication request transmission, the workstation 14 presents a web page to the workstation user prompting the user to invoke the security application stored in the communications device 20.

After invoking the security application, the communications device identifier of the communications device 20 is obtained. Next, the security application causes the communications device 20 to initiate communications over the second communications channel by transmitting the authentication request 96 and the communications device identifier to the BAC system 18. After receiving the authentication request and the communications device identifier, the BAC system 18 validates 100 the communications device 20 by determining whether the communications device 20 is known. Specifically, the BAC system 18 compares the received communications device identifier against the communications device identifiers stored therein, and determines that the communications device 20 is known when the received communications device identifier matches one of the communications device identifiers stored therein. Otherwise, when the received communications device identifier does not match one of the communications device identifiers stored in the BAC system 18, the communications device 20 is not validated 100, and processing ends 92.

After validating 100 the communications device 20, the BAC system 18 continues processing by extracting the level of risk from the authentication request and consulting the authentication policy 70 to determine 98 the biometric authentication data requirement 72 that corresponds to the extracted level of risk 64. The BAC system 18 compares the extracted level of risk against the levels of risk 64 to determine 98 and identify the corresponding biometric authentication data requirement 72. Specifically, the biometric authentication data requirement 72 is determined 98 to be the biometric authentication data requirement 72 that corresponds to the level of risk 64 that matches the extracted level of risk. After determining 98 the biometric authentication data requirement 72, the BAC system 18 generates and transmits 98 a biometric authentication data capture request to the communications device 20 over the second communications channel. After transmitting the biometric authentication data capture request to the communications device 20, processing continues by performing operations 102-124, 86 and 130 as described herein with regard to the alternative embodiment illustrated in FIGS. 10 and 10A. Next, processing ends 92.

It should be appreciated that in the alternative embodiments described herein with regard to FIGS. 10 and 10A, communications over the second communications channel in response to communications over the first communications channel facilitate more secure authentication of the workstation user on the first communications channel. Moreover, it should be understood that the alternative exemplary embodiments described herein with regard to FIGS. 10 and 10A, enable network-based electronic payment transactions to be conducted with greater security and thereby facilitate reducing risks that network-based electronic payment transactions may be conducted fraudulently.

Although the alternative embodiments described herein with regard to FIGS. 10 and 10A, and 11 and 11A, include OTPP operations 118, 120, 122 and 124, it should be appreciated that other embodiments may not include such OTPP operations. Specifically, after positively validating the identity 114 of the workstation user, instead of generating and transmitting the OTPP 118, in other embodiments the BAC system 18 may transmit a successful validation result message directly to the SPC system 16 indicating that the workstation user has been successfully validated. In response, the SPC system 16 may transmit a message to the merchant system 12 over the first communications channel indicating that the workstation user has been successfully validated. After receiving the message from the SPC system 16, the merchant system 12 accepts the inputted credit card number and completes the electronic payment transaction 86.

It should be appreciated that in the embodiment described herein with regard to FIGS. 11 and 11A, in response to a communication from the first communications channel, subsequent communications are caused to occur over the second communications channel. Specifically, the communications device 20 initiates an authentication process over the second communications channel with the BAC system 18 in response to an authentication request received over the first communications channel. The BAC system 18 receives obtained biometric data from the device 20 and biometrically validates the identity of the workstation user. Thus, by virtue of a communication over the first channel, communications are caused to be transmitted and received over the second communications channel that enable facilitating validating the identity of the workstation user on the first communications channel. Moreover, it should be appreciated that communications over the first channel, occurring after biometric authentication over the second channel, are more secure due to the high level of trust inherent with biometric authentication results.

Figure 12:
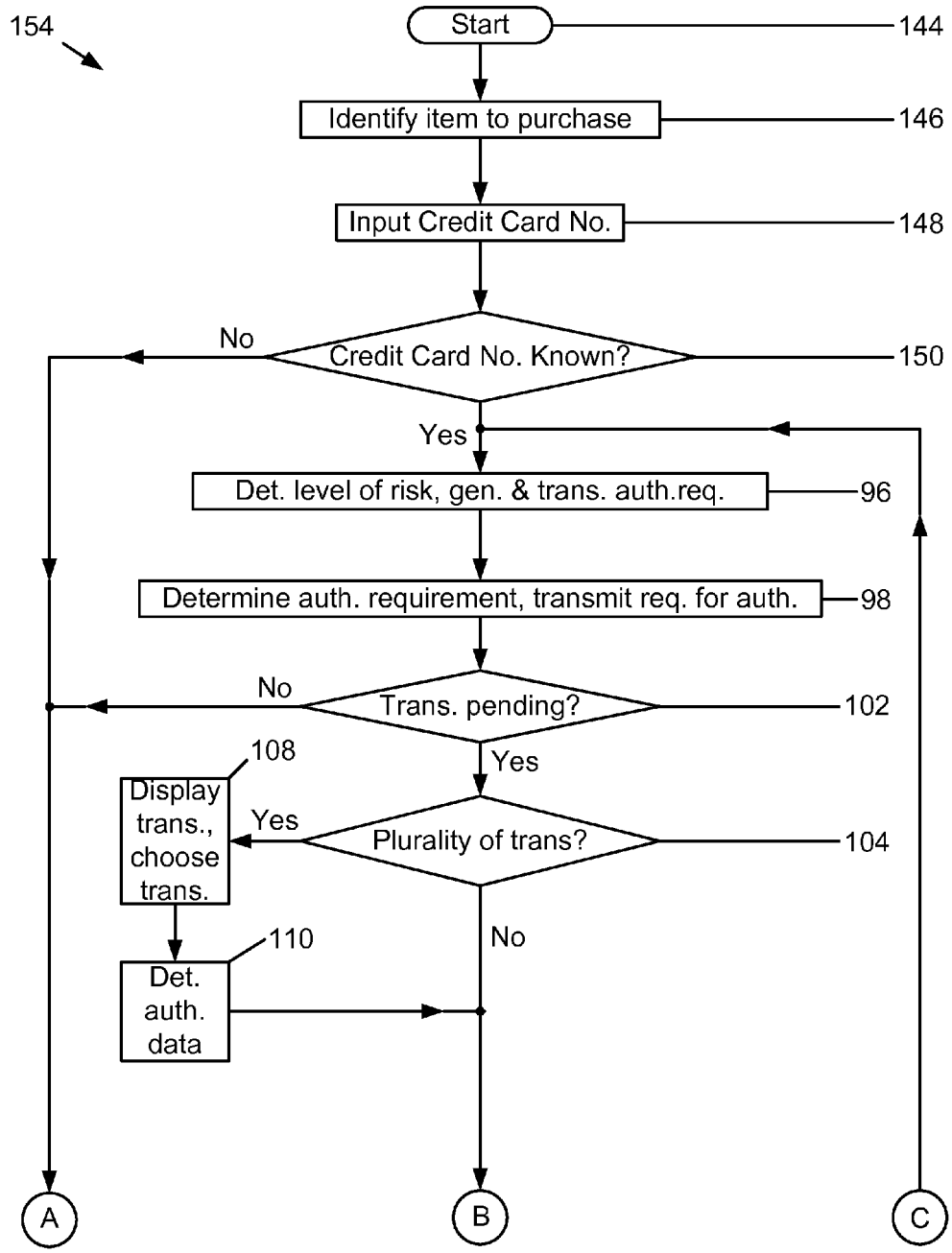
FIG. 12 is a flowchart illustrating another alternative exemplary authentication process, that uses a non-designated communications device, for reducing risks that network-based transactions may be conducted fraudulently.
Figure 12A:
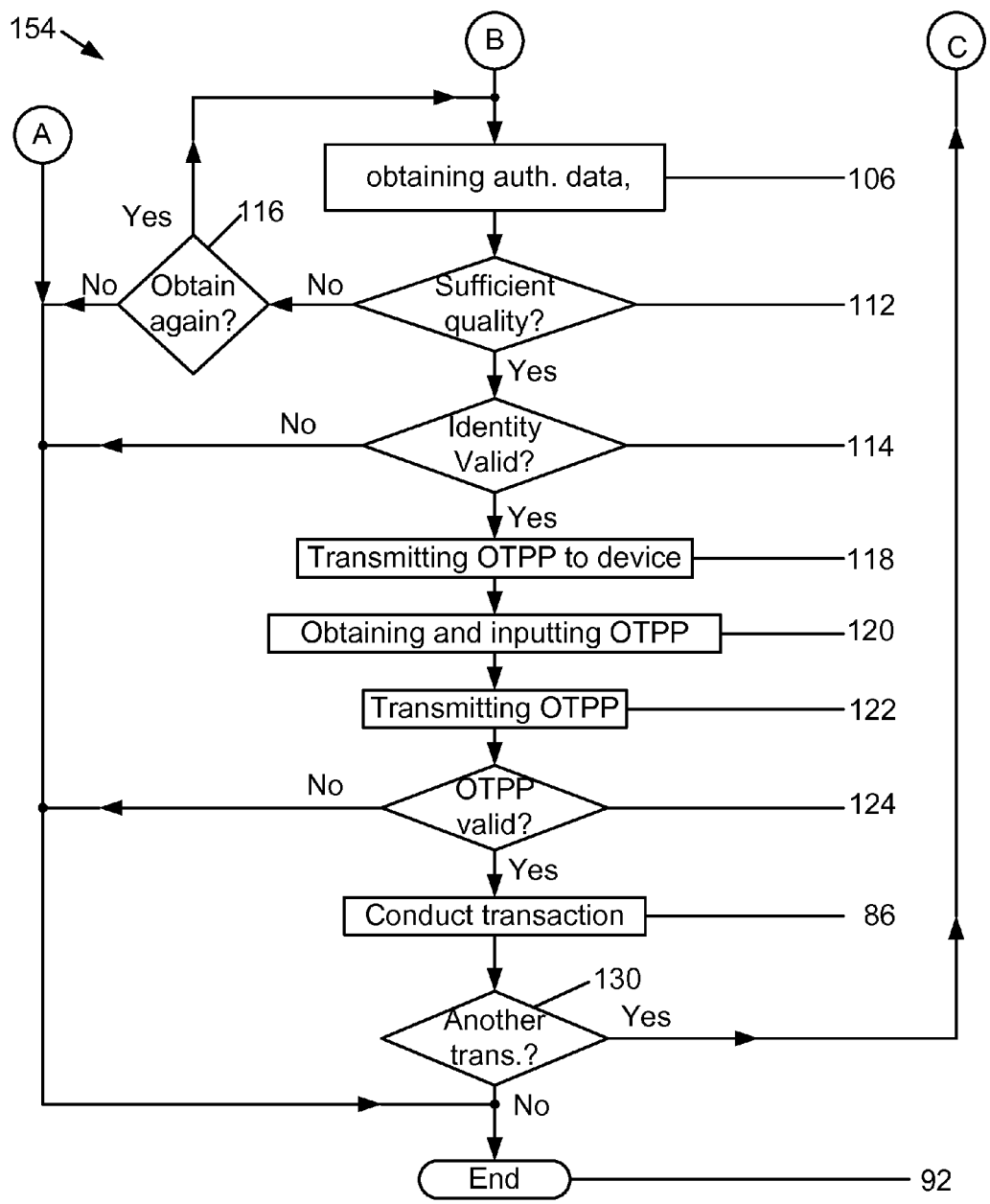
FIG. 12A is a continuation of the flowchart illustrated in FIG. 12.

The information shown in FIGS. 12 and 12A is substantially the same information shown in FIGS. 10 and 10A, respectively, as described in more detail below. As such, operations illustrated in FIGS. 12 and 12A that are identical to operations illustrated in FIGS. 10 and 10A, are identified using the same reference numerals used in FIGS. 10 and 10A.

FIG. 12 is a flowchart 154 illustrating an alternative exemplary authentication process used by the AC system 10 for reducing risks that network-based electronic payment transactions may be conducted fraudulently, and FIG. 12A is a continuation of the flowchart 154 of FIG. 12. This alternative embodiment is similar to that shown in FIGS. 10 and 10A, respectively. However, in this embodiment the communications device 20 is not enrolled in the BAC system 18, the communications device 20 is not validated and the communications device 20 is not verified as enrolled in the BAC system 18. As a result, the identity of a workstation user may be successfully validated using a communications device 20 that is not designated by the user upon enrollment in the BAC system. Consequently, in this alternative embodiment, when for example, the communications device of the workstation user is lost or malfunctioning, the identity of a workstation user may be validated with any communications device 20.

For AC system 10, processing starts 144 by conducting operations 146, 148 and 150. After determining that the inputted credit card number is known 150, the SPC system 16 transmits the inputted credit card number to the BAC system 18. In response, the BAC system 18 compares the inputted credit card number against credit card numbers stored therein. Upon determining a match between the inputted credit card number and credit card numbers stored therein, the BAC system 18 notifies the SPC system 16 of the match. In response, the SPC system 16 determines 96 the level of risk 64 associated with the electronic payment transaction 62, generates the authentication request 96, and transmits the authentication request 96 to the BAC system 18 over the first communications channel.

Next, processing continues by determining 98 the authentication data requirement 72. Upon receiving the authentication request, the BAC system 18 extracts the level of risk 64 from the authentication request and consults the authentication policy 70 to determine 98 the biometric authentication data requirement 72 that corresponds to the extracted level of risk 64. The BAC system 18 compares the extracted level of risk against the levels of risk 64 to determine 98 and identify the corresponding biometric authentication data requirement 72. Specifically, the biometric authentication data requirement 72 is determined 98 to be the biometric authentication data requirement 72 that corresponds to the level of risk 64 that matches the extracted level of risk.

After determining 98 the biometric authentication data requirement 72, the BAC system 18 automatically transmits a message to the communications device 20 to wake-up the device 20 and invoke the security application stored in the device 20. After transmitting the wake-up message, the BAC system 18 generates and transmits the biometric authentication data capture request to the communications device 20 over the second communications channel 24.

It should be appreciated that in other embodiments, after determining 98 the biometric authentication data requirement 72, instead of transmitting the biometric authentication data capture request to the communications device 20, the BAC system 18 may transmit the biometric authentication data capture request to the workstation 14 over the first communications channel. In such embodiments, upon receiving the biometric authentication data capture request, the workstation 14 displays a message prompting the user to obtain the communications device 20. The user obtains the communications device 20 and invokes the security application stored therein by activating an icon or button of the communications device 20.

Next, the BAC system 18 continues by determining whether or not a transaction is pending 102 for the communications device 20. Processing then continues by conducting operations 102-130 and 86 as described herein with regard to the alternative embodiment illustrated in FIGS. 10 and 10A. Next, processing ends 92.

It should be appreciated that in the alternative embodiments described herein with regard to FIGS. 12 and 12A, communications over the second communications channel in response to communications over the first communications channel facilitate more secure authentication of the workstation user on the first communications channel. Moreover, it should be understood that the alternative exemplary embodiments described herein with regard to FIGS. 12 and 12A, enable network-based electronic payment transactions to be conducted with greater security and thereby facilitate reducing risks that network-based electronic payment transactions may be conducted fraudulently.

It should be appreciated that although the user chooses one of the displayed pending transactions 108 in each of the embodiments described herein, in other embodiments the SPC system 16 and BAC system 18 may automatically determine a single biometric authentication data requirement 72 that facilitates simultaneously authenticating all of the pending transactions such that the user may conduct all of the pending transactions after a single authentication. Specifically, in such other embodiments, the SPC system 16 may consult the policy 60 to determine the level of risk 64 associated with each pending transaction 62. Next, the SPC system 16 may compare the levels of risk 64 for each pending transaction 62 and determine which pending transaction 62 has the greatest level of risk 64. The SPC system 16 then communicates the greatest level of risk 64 to the BAC system 18 such that the BAC system 18 is able to determine the biometric authentication data requirement 72 corresponding to the greatest level of risk 64. The BAC system 18 then includes at least the determined biometric authentication data requirement 72 in a subsequent biometric authentication data capture request and transmits the request to the SPC system 16. The biometric authentication data corresponding to the greatest level of risk 64 is obtained with the device 20 and used to validate the identity of the user. It should be understood that by virtue of authenticating to the greatest level of risk 64, all of the other pending transactions are also adequately authenticated because the other pending transactions 62 necessarily have a lower level of risk 64.

Although the BAC system 18 verifies that the OTPP transmitted from the SPC system 16 is the same as that transmitted to the communications device 20 from the BAC system 18 in exemplary embodiments described herein, it should be appreciated that in other embodiments any other device may verify an OTPP match that facilitates validating the identity of a user as described herein. For example, instead of transmitting the OTPP only to the communications device 20, the BAC system 18 may also transmit the OTPP to the SPC system 16 at the same time the OTPP is transmitted to the communications device 20. By virtue of simultaneously transmitting the OTPP to the SPC system 16 and the communications device 20, the OTPP verification may be securely performed at the SPC system 16. Doing so facilitates reducing the time required to authenticate and grant access to a user.

It should be understood that the merchant system 12, workstation 14, SPC system 16, BAC system 18 and communications device 20 may be configured to communicate in any manner, and in any order, to authenticate users as authorized users and thus reduce risks that network-based transactions may be conducted fraudulently.

It should be understood that as described herein the communications device 20 is not operable to store biometric data, is not operable to biometrically authenticate workstation users as authorized users, and is not operable to generate one-time pass-phrases due to security concerns associated with the communications device 20. Specifically, by virtue of being a relatively small and portable device the communications device 20 may be easily lost or stolen. When the communications device 20 is stolen, any confidential data stored therein may be discovered. Thus, if confidential data such as biometric data is stored in the communications device 20, the biometric data may be discovered and used to authenticate an unauthorized user as an authorized user such that the unauthorized user is able conduct fraudulent network-based transactions. By storing confidential enrollment data in the BAC system 16, separate from the communications device 20, the security of the confidential enrollment data is facilitated to be enhanced such that unauthorized users cannot obtain the biometric data to conduct fraudulent network-based transactions.

Although the BAC system 18 determines the authentication requirement by comparing an extracted level of risk against levels of risk 64 included in authentication policies stored therein in the embodiments described herein, it should be appreciated that in other embodiments the communications device 20 may determine the authentication requirement by comparing the extracted level of risk against levels of risk 64 included in authentication policies stored in the device 20.

It should be appreciated that biometrically authenticating identities facilitates increasing the level of trust that a user attempting to conduct a network-based transaction is an authorized user. Moreover, it should be appreciated that providing an OTPP contingent on successfully biometrically authenticating the user enhances the level of trust in an authentication result. Furthermore, it should be understood that by virtue of using an out-of-band communications device, separate and distinct from the workstation 14, for capturing and transmitting biometric data and for receiving and transmitting the OTPP, an additional level of security is provided which also facilitates increasing the trust in an authentication result that indicates a user is an authorized user. By implementing a higher authentication standard, it is more difficult for an unauthorized user to be authenticated as an authorized user. Thus, by virtue of facilitating an increase in trust in an authentication result that indicates a user is an authorized user, the processes and systems described herein facilitate increasing the security of network-based transactions. Moreover, by virtue of facilitating an increase in the security of network-based transactions, the processes and systems described herein facilitate reducing risks that network-based transactions will be conducted fraudulently.

The processes and systems described herein facilitate increasing the level of trust in network-based authentication results, and thus facilitate reducing risks that network-based transactions will be conducted fraudulently. The processes and systems described herein are believed to be applicable to many different businesses for reducing risks that network-based transactions associated with these different businesses will be conducted fraudulently. Although the example embodiment described herein is the financial business, the invention is in no way limited to the financial business. For example, the invention may also be used to facilitate reducing risks that network-based medical record transactions will be fraudulently conducted by an unauthorized user.

In each embodiment, the above-described processes for authenticating the identity of an individual desiring to conduct network-based transactions, facilitate reducing risks that data or information used in conducting the transaction will be obtained and fraudulently used by an unauthorized user. In exemplary embodiments described herein, a level of risk associated with a transaction is determined each time a workstation user attempts to conduct a transaction, and biometric data corresponding to the level of risk may be captured from the workstation user at a communications device and used for biometrically authenticating the workstation user. Upon proper biometric authentication, a one-time pass-phrase is forwarded to the communications device and transferred from the communications device to the workstation to facilitate authenticating the workstation user as an authorized user.

In yet another exemplary embodiment, a capture level is associated with each level of risk and is entered into a communications device to determine biometric authentication data to be captured and used for authentication. Upon proper biometric authentication, the authorized user is permitted to conduct the network-based transaction. As a result, in each exemplary embodiment, the level of trust in the authentication result is facilitated to be increased, the level of risk associated with conducting transactions over a network is facilitated to be reduced, and costs incurred due to users perpetuating fraud upon a network are facilitated to be reduced. Accordingly, network-based transaction risks are facilitated to be reduced and network-based transactions are facilitated to be enhanced in a cost effective and reliable manner.

Exemplary embodiments of authentication processes and systems that facilitate reducing risks that network-based transactions will be fraudulently conducted are described above in detail. The processes are not limited to use with the specific computer system embodiments described herein, but rather, the processes can be utilized independently and separately from other processes described herein. Moreover, the invention is not limited to the embodiments of the processes and systems described above in detail. Rather, other variations of the processes may be utilized within the spirit and scope of the claims.

While the invention has been described in terms of various specific embodiments, those skilled in the art will recognize that the invention can be practiced with modification within the spirit and scope of the claims.

What is claimed is:

1. A method of authenticating users to reduce transaction risks comprising:
  generating a merchant authentication request using a merchant system for a payment transaction and transmitting the merchant authentication request to a service provider server, the service provider server being different than the merchant system and the merchant authentication request including at least a unique user identifier for completing the transaction;
  transmitting a biometric authentication request from the service provider server over a first communications channel to a workstation, the biometric authentication request including at least a risk level of the payment transaction;
  in response to receiving the biometric authentication request at the workstation, invoking a security application stored in a communications device;
  initiating communications over a second communications channel by transmitting the biometric authentication request to an authentication system from the communications device over the second communications channel;
  extracting a risk level from the biometric authentication request;
  determining a biometric authentication data requirement corresponding to the extracted risk level;
  generating a biometric authentication data capture request in response to the biometric authentication request, and transmitting the biometric authentication data capture request from the authentication system to the communications device;
  validating the identity of a user;
  generating a one-time pass-phrase, storing the one-time pass-phrase on the authentication system and transmitting the one-time pass-phrase to the communications device over the second communications channel when the user is validated as one of a plurality of authorized users;
  obtaining the one-time pass-phrase from the communications device and inputting the one-time pass-phrase into the workstation;
  transmitting the one-time pass-phrase from the workstation to the authentication system over the first communications channel, and comparing the transmitted one-time pass-phrase against the stored one-time pass-phrase; and
  completing the payment transaction with the unique user identifier when the identity of the user is validated, the transmitted and stored one-time pass-phrases match, and the stored one-time pass-phrase has not expired.

2. A method of authenticating users in accordance with claim 1, said determining a biometric authentication data requirement step comprising:
  comparing the extracted risk level against policy risk levels included in an authentication policy; and
  determining the biometric authentication data requirement to be the biometric authentication data requirement that corresponds to the policy risk level that matches the extracted risk level.

3. A method of authenticating users in accordance with claim 1, said transmitting a biometric authentication request from the service provider server over the first communications channel to a workstation step occurring when the communications device is associated with the unique user identifier and is enrolled in the authentication system.

4. A method of authenticating users in accordance with claim 1, said validating step comprising:
  obtaining the biometric authentication data capture request transmission;
  obtaining biometric authentication data in accordance with the biometric authentication data capture request from the user using the communications device;
  transmitting the obtained biometric authentication data from the communications device to the authentication system over the second communications channel; and
  comparing the obtained biometric authentication data against biometric authentication data of the user stored in the authentication system.

5. A method of authenticating users in accordance with claim 1, further comprising associating the communications device with one of a plurality of authorized users, the user being the authorized user associated with the inputted information.

6. A method of authenticating users in accordance with claim 3, further comprising:
  inputting the unique user identifier into the workstation and transmitting the unique user identifier to the service provider server;
  determining whether the unique user identifier is known by comparing the unique user identifier against identifiers stored in the service provider server;
  transmitting the unique user identifier to the authentication system when the unique user identifier is known; and
  comparing the unique user identifier against identifiers stored in the authentication system, wherein the unique user identifier is a credit card number.

7. A method of authentication comprising:
  selecting a payment transaction method from a menu of payment transaction methods with a workstation to complete a payment transaction on a merchant system;

39 prompting a workstation user to input a unique user identifier into the workstation prior to completing the payment transaction on the merchant system;
generating a merchant authentication request with the merchant system and transmitting the merchant authentication request to a service provider server, the service provider server being different than the merchant system and the merchant authentication request including at least the unique user identifier;
determining a risk level associated with the transaction and generating a server authentication request with the service provider server, the server authentication request including at least the risk level;
transmitting the server authentication request to the workstation over a first communications channel;
in response to the workstation receiving the server authentication request, transmitting the server authentication request from the device to an authentication system over a second communications channel;
extracting the risk level from the server authentication request;
determining a biometric authentication data requirement corresponding to the extracted risk level using the authentication system;
obtaining biometric authentication data in accordance with the biometric authentication data requirement using the communications device;
validating the identity of the workstation user by comparing the obtained biometric data against an enrollment data record of an authorized user that is associated with the communications device in the authentication system;
generating a one-time pass-phrase with the authentication system and transmitting the one-time pass-phrase to the communications device when the obtained biometric data matches the enrollment data record;
obtaining the one-time pass-phrase from a display of the communications device;
entering the one-time pass-phrase into the workstation;
transmitting the one-time pass-phrase from the workstation to the service provider server and from the service provider server to the authentication system;
validating the one-time pass-phrase and verifying the one-time pass-phrase has not expired;
determining that the workstation user is permitted to conduct the transaction; and
transmitting the authentication confirmation message from the service provider server to the merchant system and completing the payment transaction with the unique user identifier.

8. A method of authentication in accordance with claim 7, said determining a biometric authentication data requirement step comprising:
comparing the extracted risk level against policy risk levels included in an authentication policy; and
determining the biometric authentication data requirement to be the biometric authentication data requirement that corresponds to the policy risk level that matches the extracted risk level.

9. A method of authentication in accordance with claim 7, said determining a risk level step comprising:
determining risk factors of the transaction;
comparing risk levels associated with each of the risk factors to determine a greatest risk level; and
determining the risk level to be the greatest risk level.

10. A method of authentication in accordance with claim 7, said obtaining step comprising:

40 invoking a security application stored in the communications device, and transmitting an authentication data capture request from the authentication system to the communications device, the authentication data capture request including at least the biometric authentication data requirement;
verifying the authentication data capture request was transmitted from the authentication system; and
displaying the authentication data capture request when the authentication data capture request was verified as transmitted from the authentication system.

11. A method of authentication in accordance with claim 10, said invoking step comprising one of:
transmitting a message from the authentication system to the communications device; and
prompting the workstation user to obtain the communications device and activate an icon or button of the communications device.

12. A method of authentication in accordance with claim 7, further comprising conducting said generating a merchant authentication request step when the communications device associated with the workstation user is enrolled in the authentication system.

13. A system for authenticating users that reduces transaction risks comprising:
a computer configured as a service provider server, said service provider server comprising a database and being configured to store within said database at least a plurality of configurable policies, to determine whether inputted information is known, and to determine a risk level associated with at least one payment transaction;
at least one workstation including at least a workstation computer configured to receive a one-time pass-phrase input into said workstation, said service provider server being configured to generate and transmit biometric authentication requests to said at least one workstation over a first communications channel;
at least one merchant computer system configured to generate and transmit authentication requests and to complete the at least one payment transaction with a unique user identifier when the identity of a user is validated;
an authentication computer system comprising an authentication database configured to store biometric authentication data associated with each of a plurality of authorized users, to store an authentication policy, and to conduct a biometric authentication process; and
a communications hardware device configured to transmit a biometric authentication request to said authentication computer system over a second communications channel after the request is received by said workstation, to receive a biometric authentication data capture request transmitted from said authentication computer system, to obtain biometric authentication data in accordance with the biometric authentication data capture request from the user and transmit the obtained biometric data to said authentication computer system, wherein said service provider server, said at least one workstation, said at least one merchant computer system, said authentication computer system, and said communications hardware device are configured to communicate over a network,
said authentication computer system is further configured to generate and store a one-time pass-phrase before transmitting the one-time pass-phrase to said communications hardware device over the second communications channel when the user is validated, receive a one-time pass-phrase from said workstation over the first communications channel, and compare the received one-time pass-phrase against the transmitted one-time pass-phrase, and said merchant computer system is further configured to conduct the at least one payment transaction when the user is validated, the received and transmitted one-time pass-phrases match, and the stored one-time pass-phrase has not expired.

14. A system in accordance with claim 13, said authentication computer system being further configured to compare the obtained biometric data against biometric authentication data of the user stored therein to validate the user.

* * * * *